(12) United States Patent
Koh et al.

(10) Patent No.: US 9,075,172 B2
(45) Date of Patent: Jul. 7, 2015

(54) LIGHT CONVERTING OPTICAL STRUCTURE AND LIGHTING DEVICE UTILIZING THE SAME

(75) Inventors: Zhi-Wei Koh, Hsinchu County (TW); Chi-Jen Kao, Taipei (TW); Wen-Chiun Ing, Taipei County (TW); Wei-Hsin Hou, Taipei (TW)

(73) Assignee: Luxingtek, LTD., Zhubei (TW)

( * ) Notice: Subject to any disclaimer, the term of this patent is extended or adjusted under 35 U.S.C. 154(b) by 399 days.

(21) Appl. No.: 12/885,949

(22) Filed: Sep. 20, 2010

(65) Prior Publication Data

US 2012/0069575 A1    Mar. 22, 2012

(51) Int. Cl.
*F21V 5/00*    (2015.01)
*F21V 3/00*    (2015.01)
*F21V 8/00*    (2006.01)

(52) U.S. Cl.
CPC ............ *G02B 6/0021* (2013.01); *G02B 6/0018* (2013.01); *G02B 6/0036* (2013.01); *G02B 6/0046* (2013.01); *G02B 6/0055* (2013.01)

(58) Field of Classification Search
CPC .. G02B 6/0021; G02B 6/0036; G02B 6/0046; G02B 6/0018; G02B 6/0055; G02B 19/0028; G02B 19/0061; G02B 19/0066; G02B 5/021
USPC .......... 362/311.01, 311.02, 311.03, 326, 317, 362/307, 296.01, 341, 257, 555, 560, 545, 362/222–223, 244–245; 313/512
See application file for complete search history.

(56) References Cited

U.S. PATENT DOCUMENTS

| | | | |
|---|---|---|---|
| 2,254,961 A * | 9/1941 | Harris | 362/327 |
| 5,921,651 A * | 7/1999 | Ishikawa | 362/624 |
| 6,679,621 B2 | 1/2004 | West et al. | |
| 7,246,931 B2 * | 7/2007 | Hsieh et al. | 362/612 |
| 7,258,473 B2 * | 8/2007 | Okamura et al. | 362/545 |
| 7,287,891 B1 * | 10/2007 | Park et al. | 362/555 |
| 7,334,933 B1 * | 2/2008 | Simon | 362/615 |
| 7,336,339 B2 * | 2/2008 | Ho | 313/555 |
| 7,341,358 B2 * | 3/2008 | Hsieh et al. | 362/97.1 |

(Continued)

FOREIGN PATENT DOCUMENTS

| | | |
|---|---|---|
| CN | 101515068 A | 8/2009 |
| CN | 101788118 A | 7/2010 |

OTHER PUBLICATIONS

Office Action for Chinese counterpart application to the present US application, Nov. 2, 2012, 8 pages (including English translation of Remarks).

(Continued)

*Primary Examiner* — Jong-Suk (James) Lee
*Assistant Examiner* — Tsion Tumero
(74) *Attorney, Agent, or Firm* — Skaar Ulbrich Macari, P.A.

(57) ABSTRACT

A lighting device including a light converting structure, a light accommodating structure, and a lighting device that utilizes a light converting structure and/or a light accommodating structure to obtain a thinner configuration. The light converting structure includes a bottom conical recess to accommodate a light source, and a top conical recess to distribute the lights emitted from the light source. The light accommodating structure includes a through hole with a small opening and a large opening. A light source is accommodated in the through hole at the large opening, and the lights emitted from the light source output at the small opening.

14 Claims, 42 Drawing Sheets

(56) References Cited

U.S. PATENT DOCUMENTS

| | | | |
|---|---|---|---|
| 7,413,318 B2 * | 8/2008 | Hsu et al. | 362/97.1 |
| 7,414,270 B2 | 8/2008 | Kim et al. | |
| 7,458,714 B2 * | 12/2008 | Chang | 362/626 |
| 7,549,781 B2 * | 6/2009 | Kim et al. | 362/555 |
| 7,585,083 B2 | 9/2009 | Kim et al. | |
| 7,654,687 B2 * | 2/2010 | Tsai et al. | 362/237 |
| 7,791,683 B2 * | 9/2010 | Larson et al. | 349/62 |
| 8,246,197 B2 * | 8/2012 | Huang | 362/235 |
| 8,297,786 B2 * | 10/2012 | Shani et al. | 362/247 |
| 8,439,545 B2 * | 5/2013 | Cheong et al. | 362/561 |
| 2004/0042194 A1 * | 3/2004 | Hsieh | 362/31 |
| 2008/0055931 A1 * | 3/2008 | Verstraete et al. | 362/612 |
| 2008/0151551 A1 | 6/2008 | Yang et al. | |
| 2008/0191620 A1 * | 8/2008 | Moriyama et al. | 313/506 |
| 2008/0247173 A1 * | 10/2008 | Danek et al. | 362/309 |
| 2009/0016068 A1 * | 1/2009 | Chang | 362/309 |
| 2009/0034264 A1 * | 2/2009 | Zhu et al. | 362/297 |
| 2009/0180282 A1 * | 7/2009 | Aylward et al. | 362/245 |
| 2010/0149783 A1 * | 6/2010 | Takenaka et al. | 362/84 |
| 2010/0195315 A1 | 8/2010 | Ohkawa | |
| 2010/0302135 A1 * | 12/2010 | Larson et al. | 345/102 |
| 2011/0069496 A1 * | 3/2011 | Ing et al. | 362/311.02 |
| 2011/0090672 A1 | 4/2011 | Zhu et al. | |
| 2011/0249214 A1 | 10/2011 | Cheong et al. | |
| 2012/0069575 A1 | 3/2012 | Koh et al. | |

OTHER PUBLICATIONS

Search report for PCT counterpart application PCT/CN2012/081260, dated Nov. 29, 2012, 14 pages (including English translation of Remarks).

Office Action for Taiwanese counterpart application to the present US application, Nov. 21, 2013, 11 pages (including English summary).

* cited by examiner

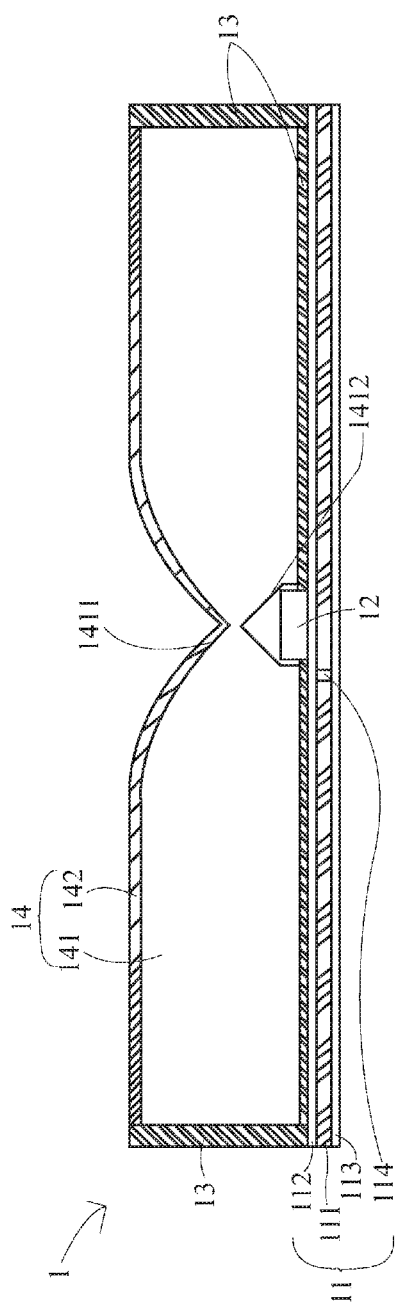
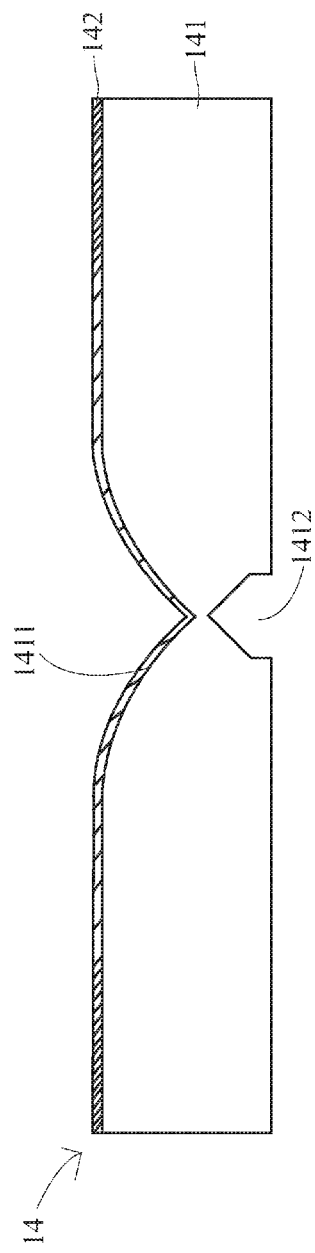

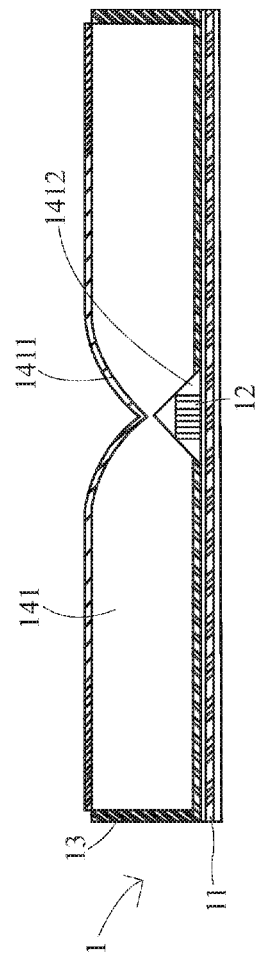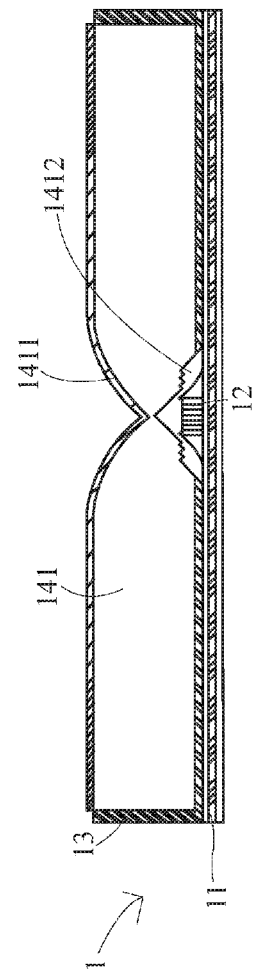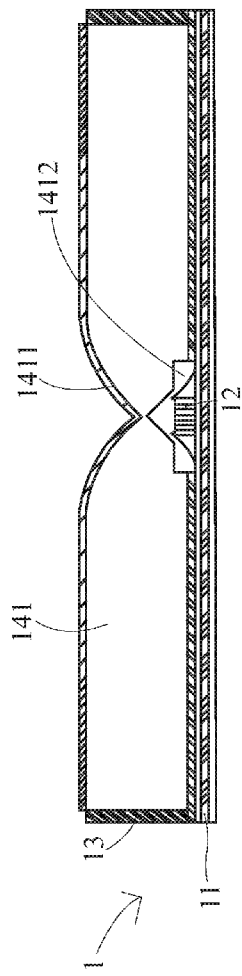

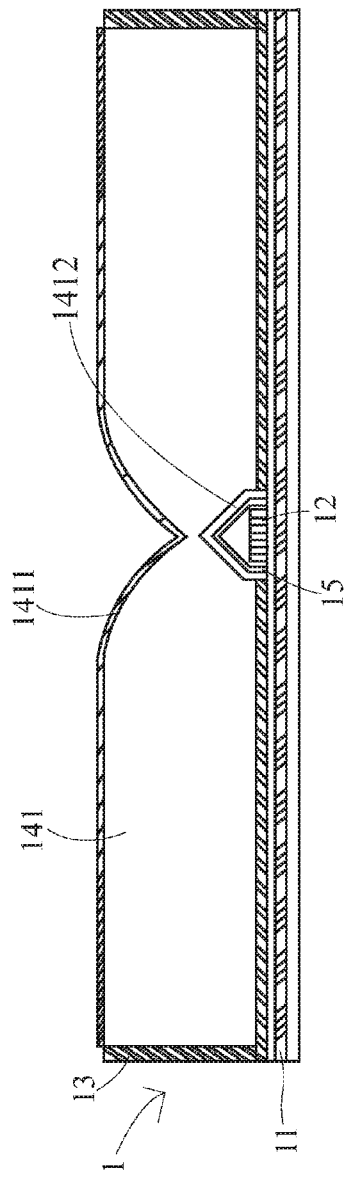
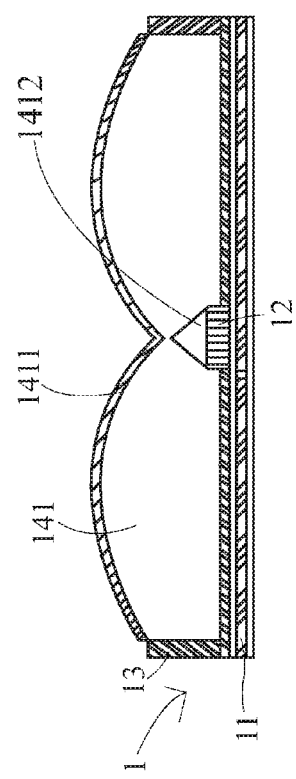

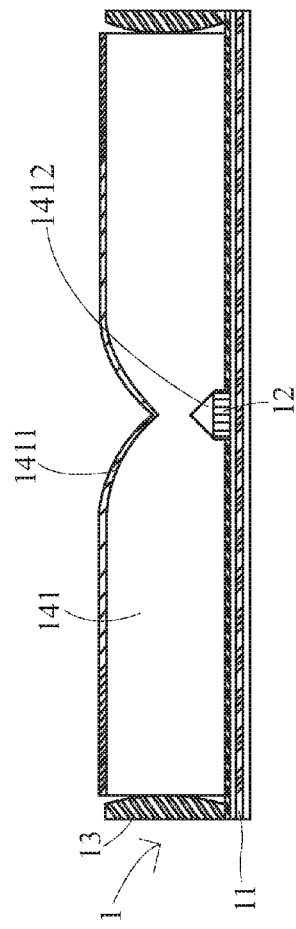
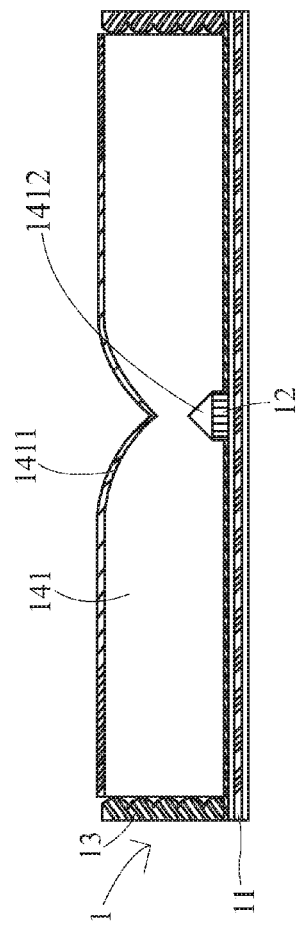

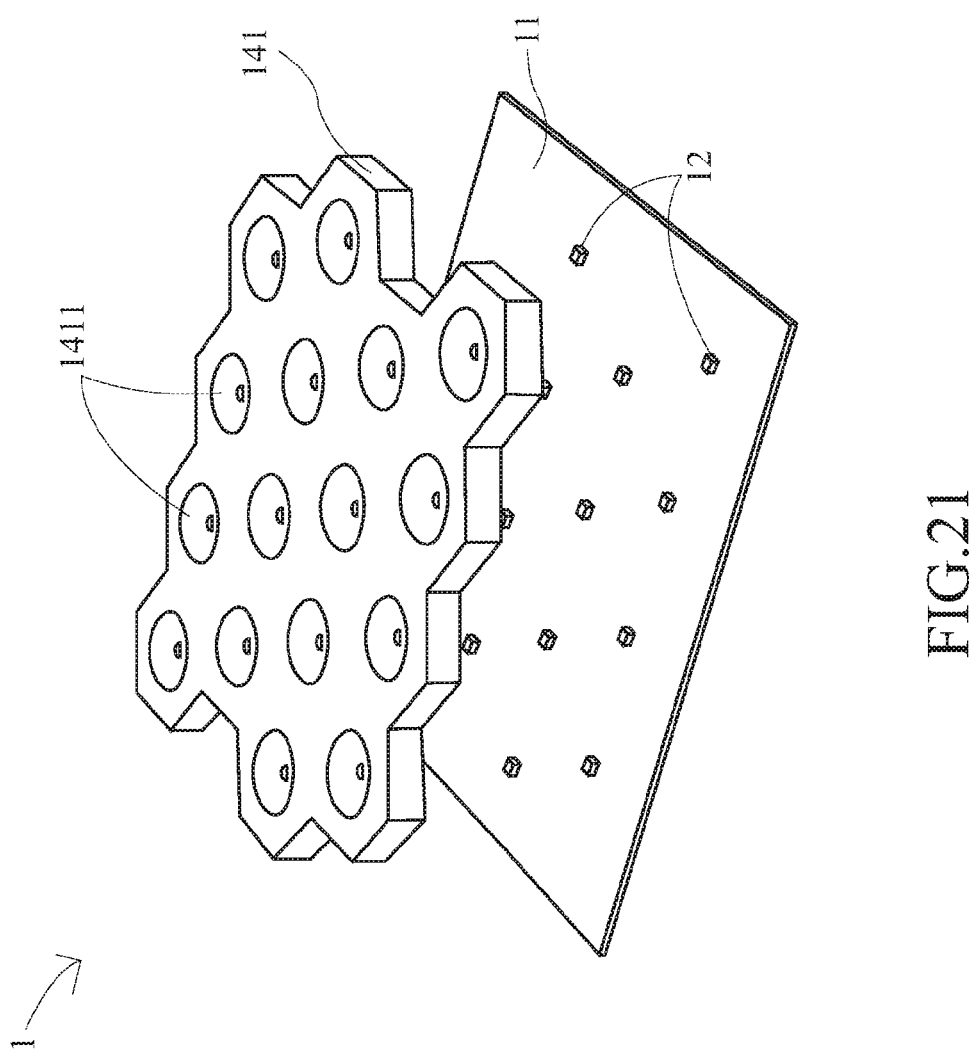

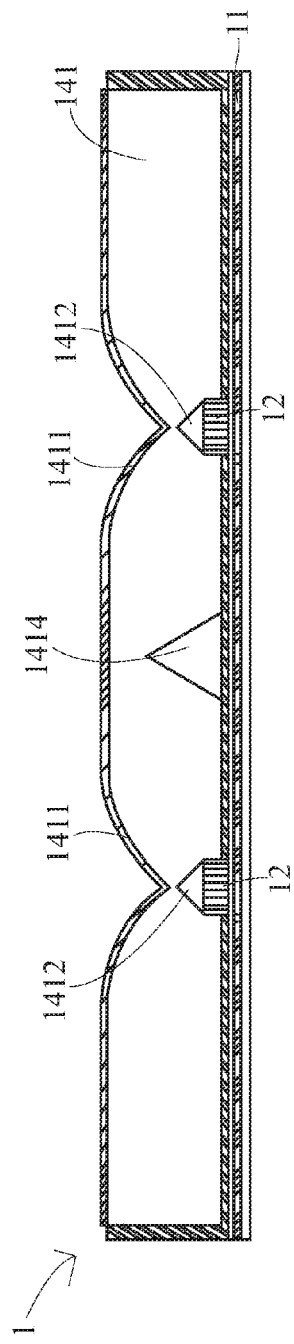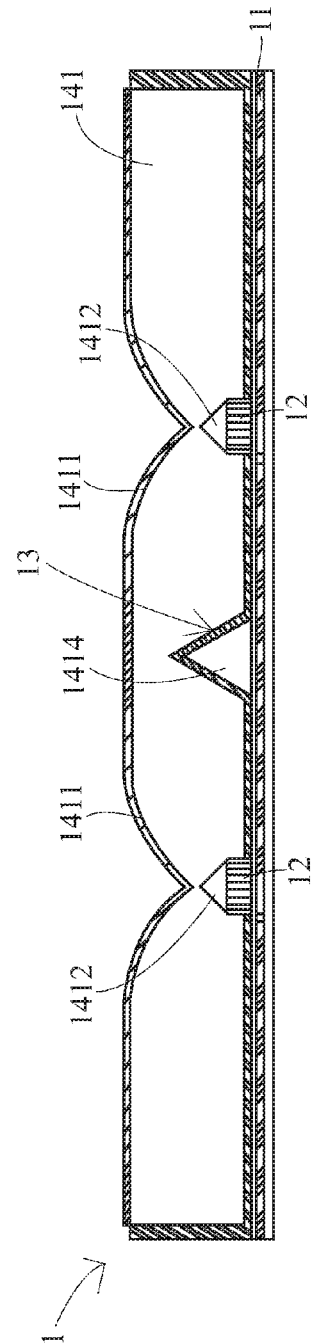

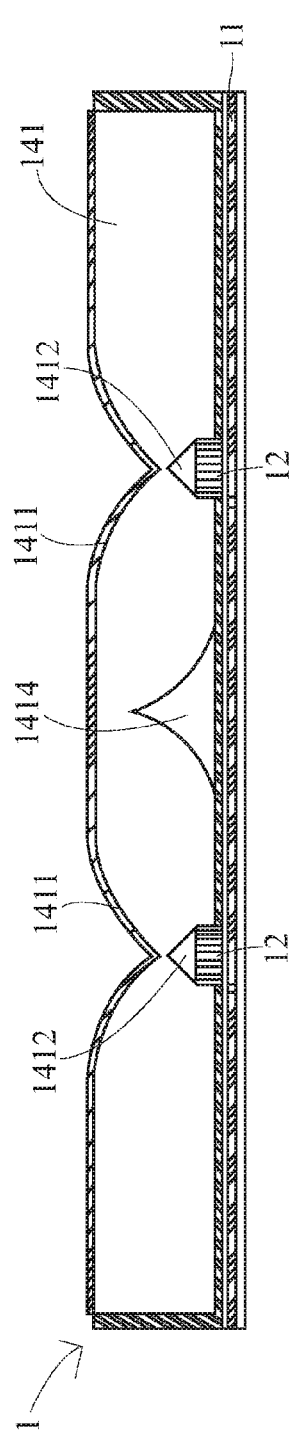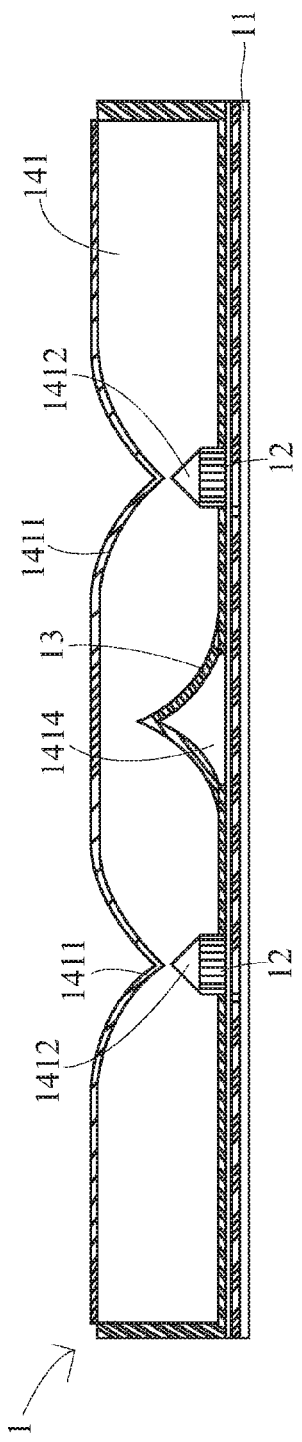

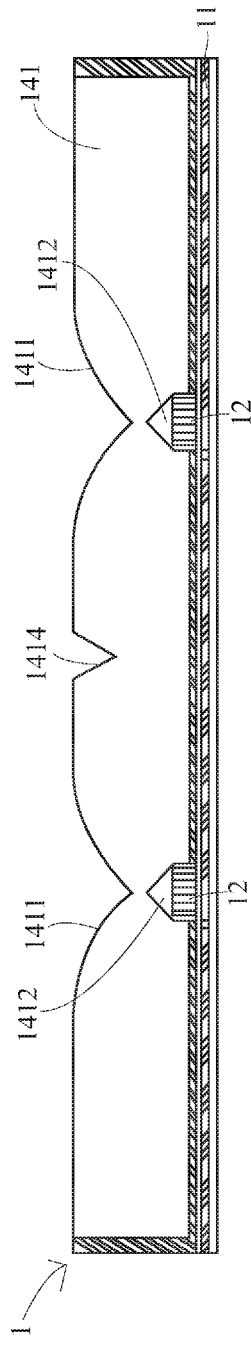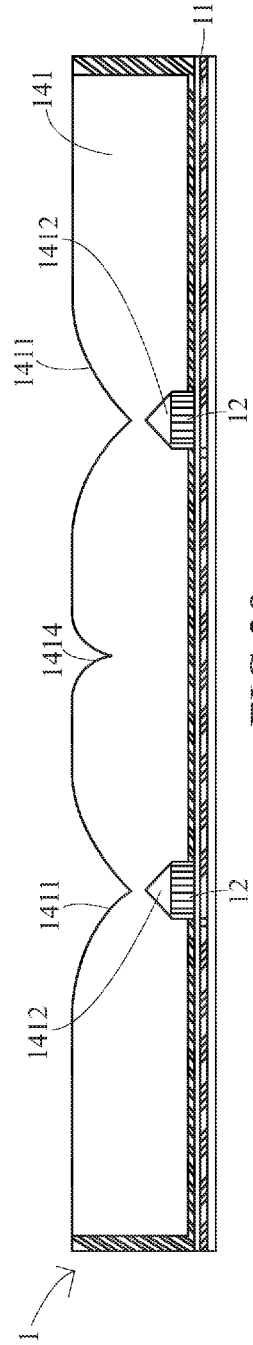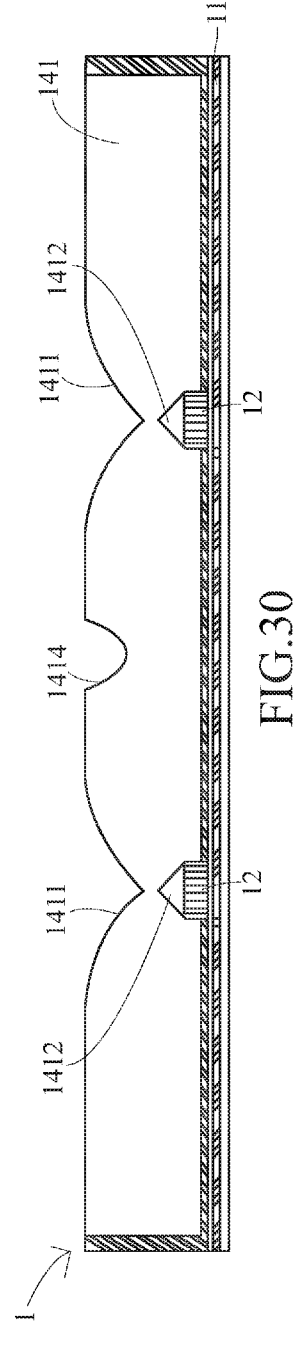

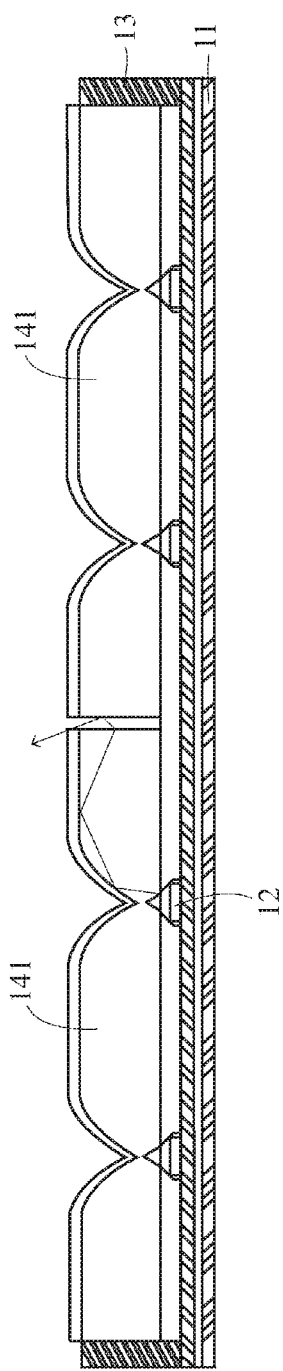
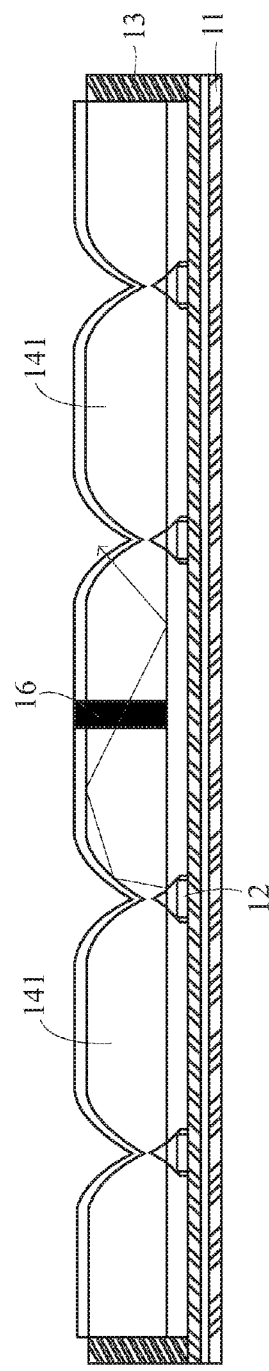

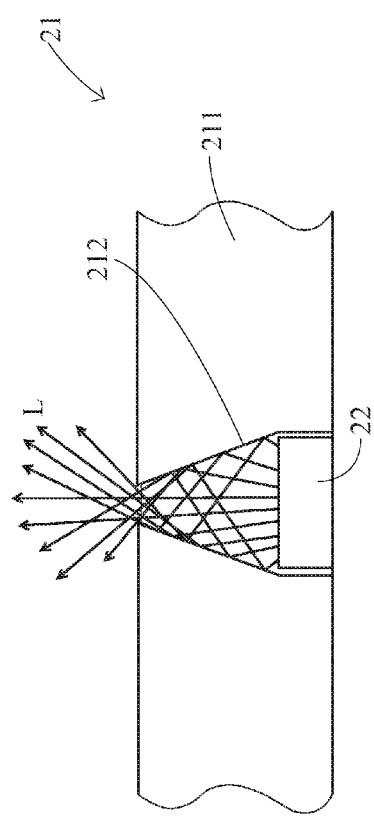
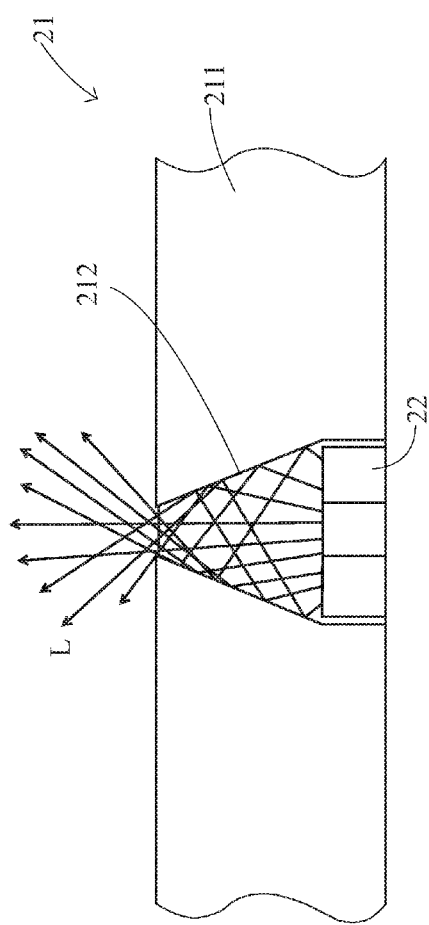

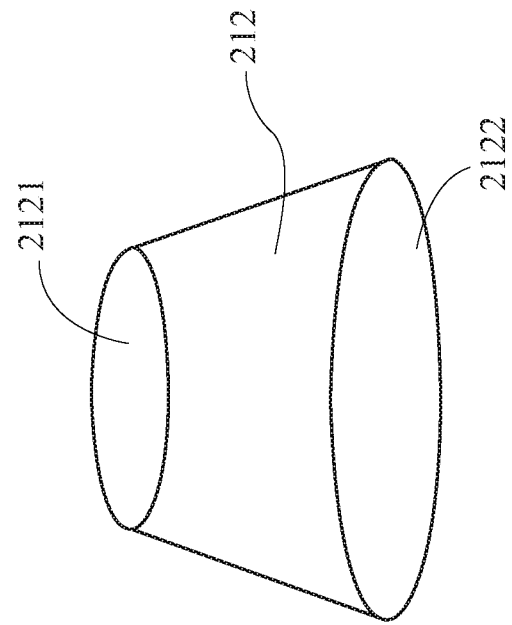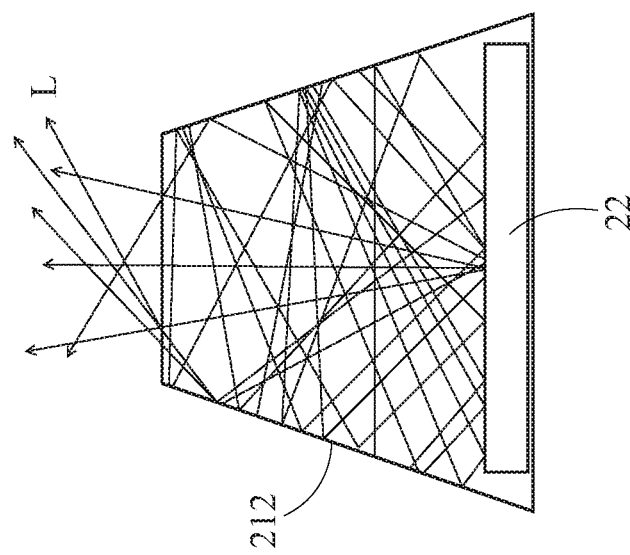
FIG.41

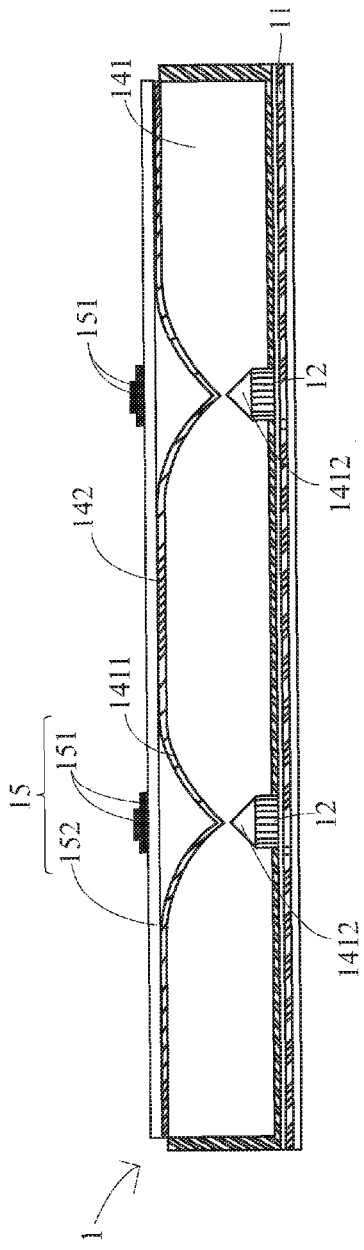
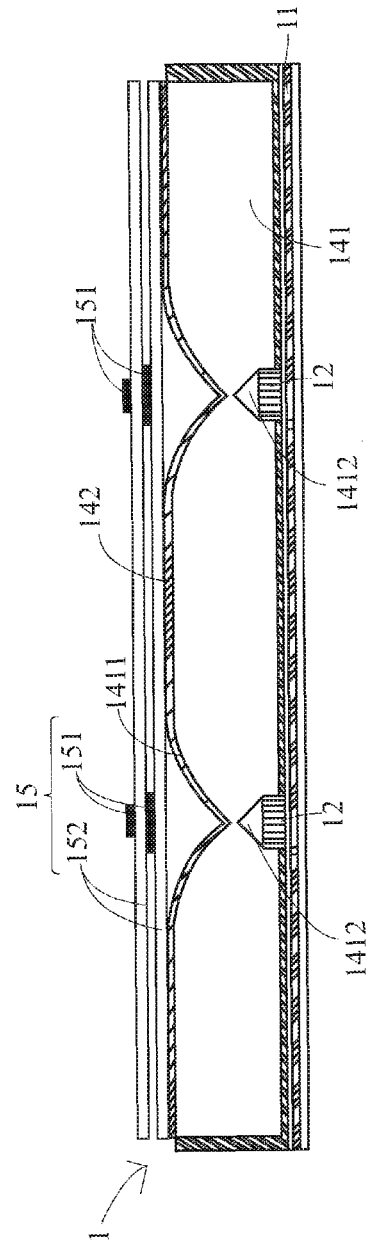

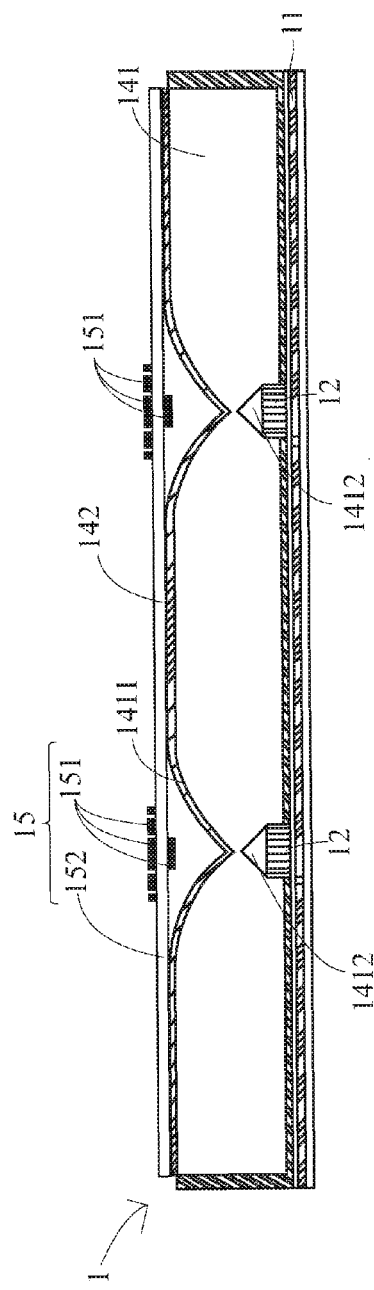
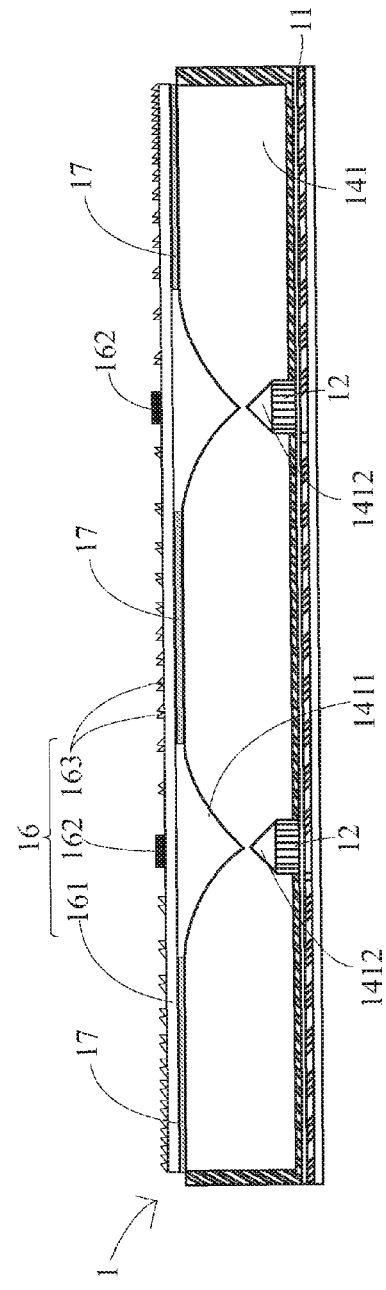

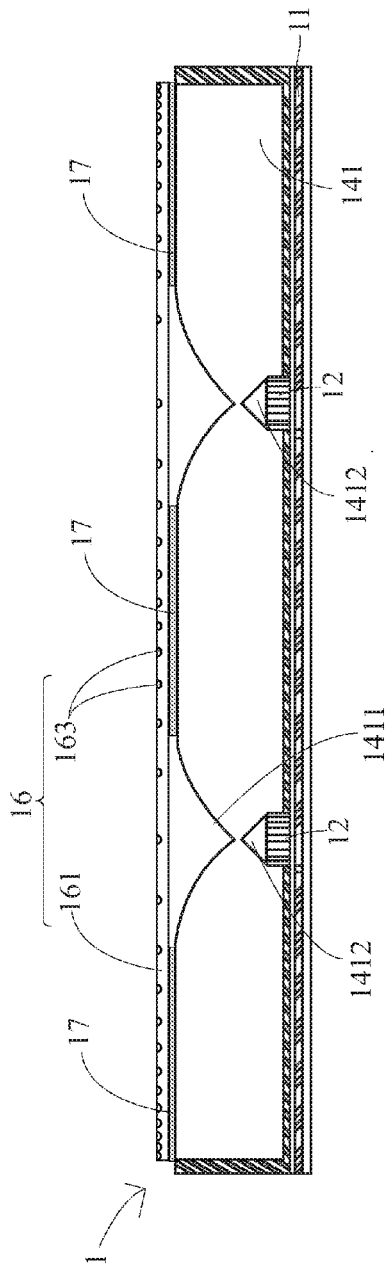
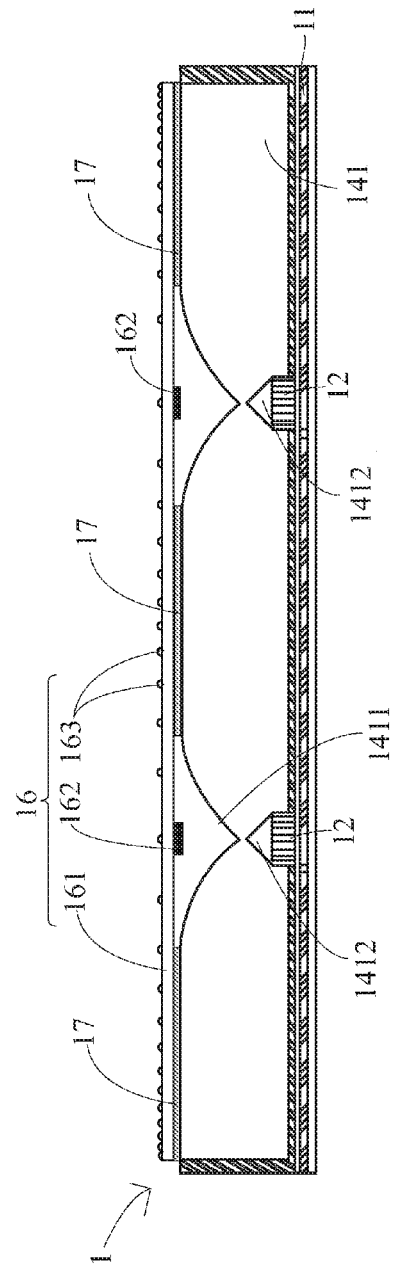
FIG.57
FIG.58

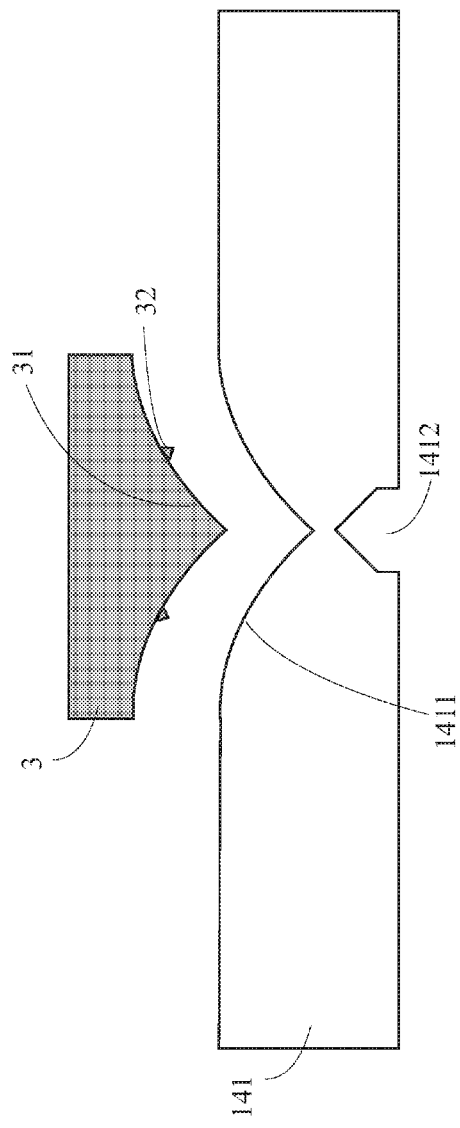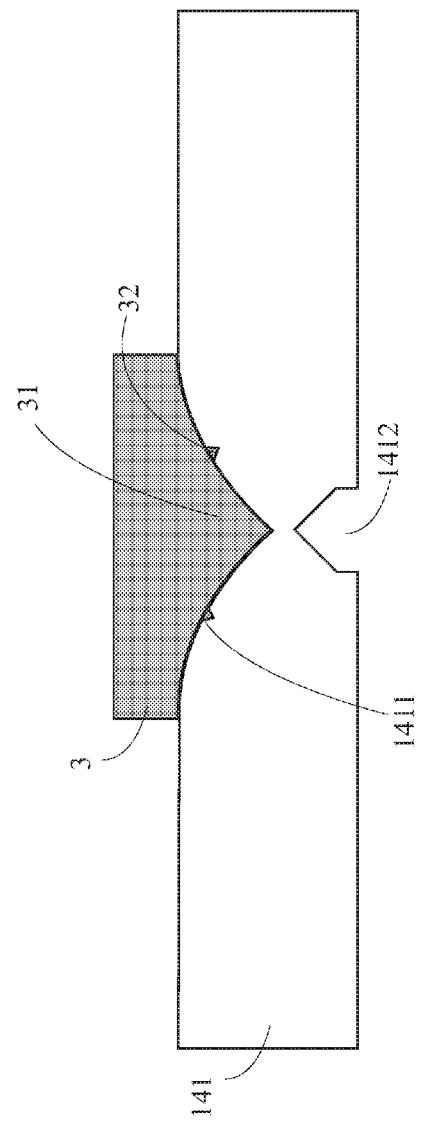
FIG.59A
FIG.59B

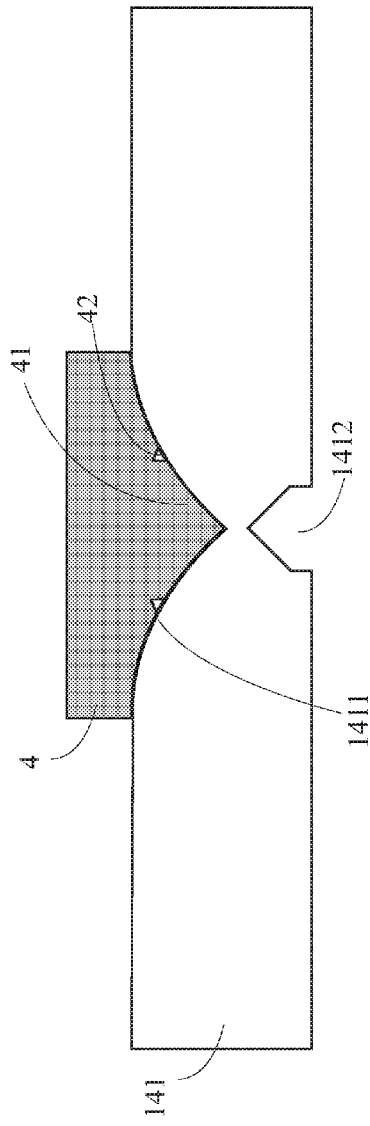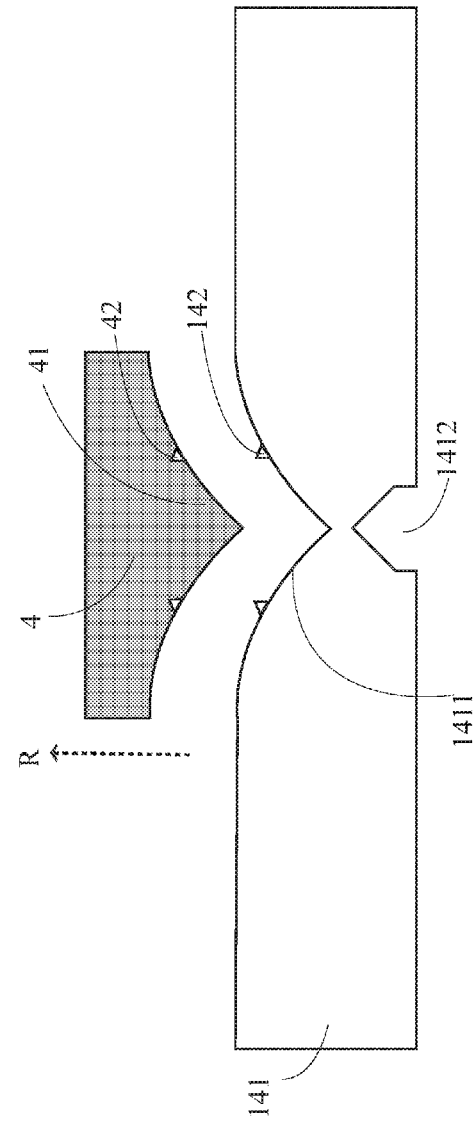

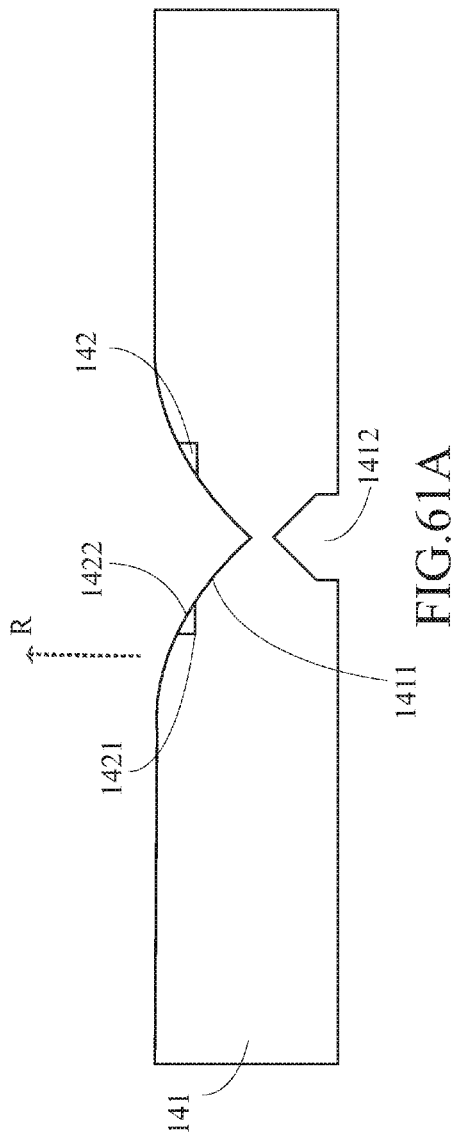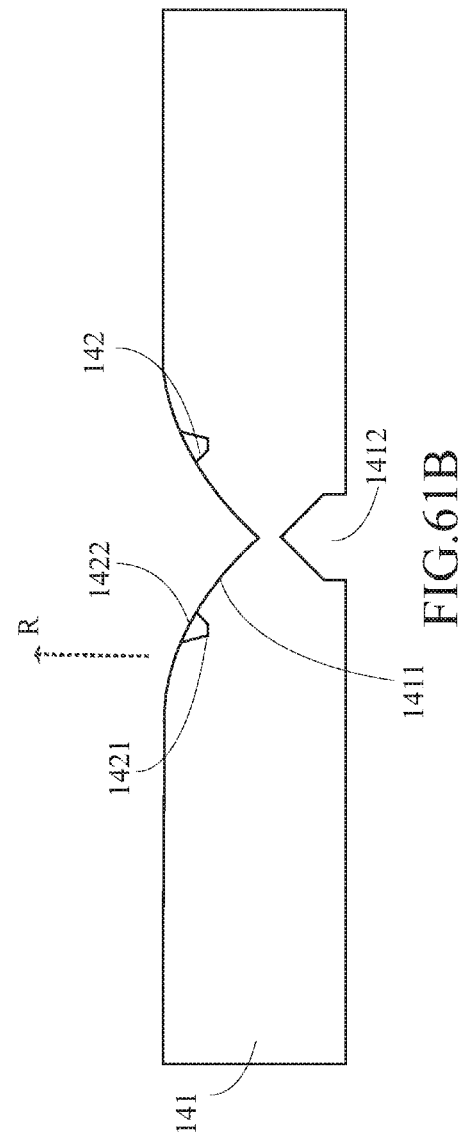

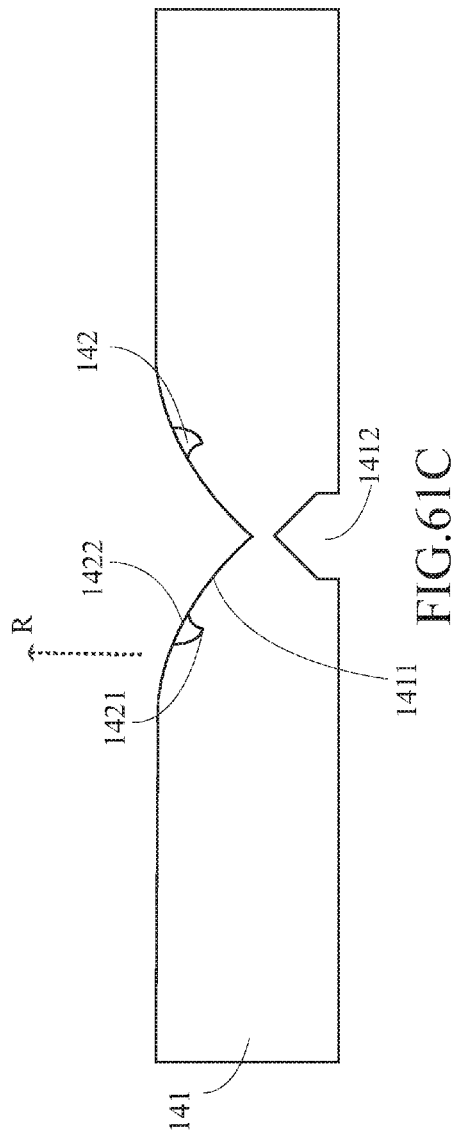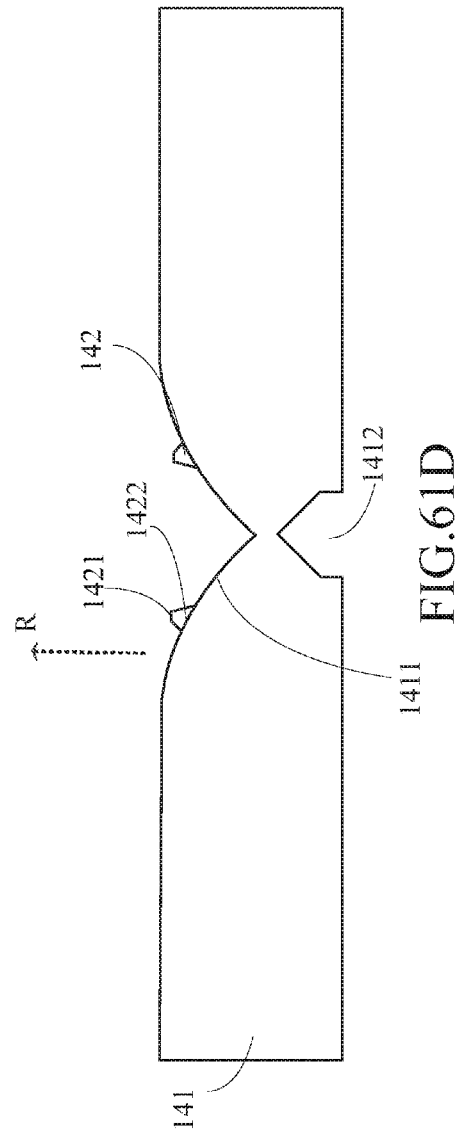

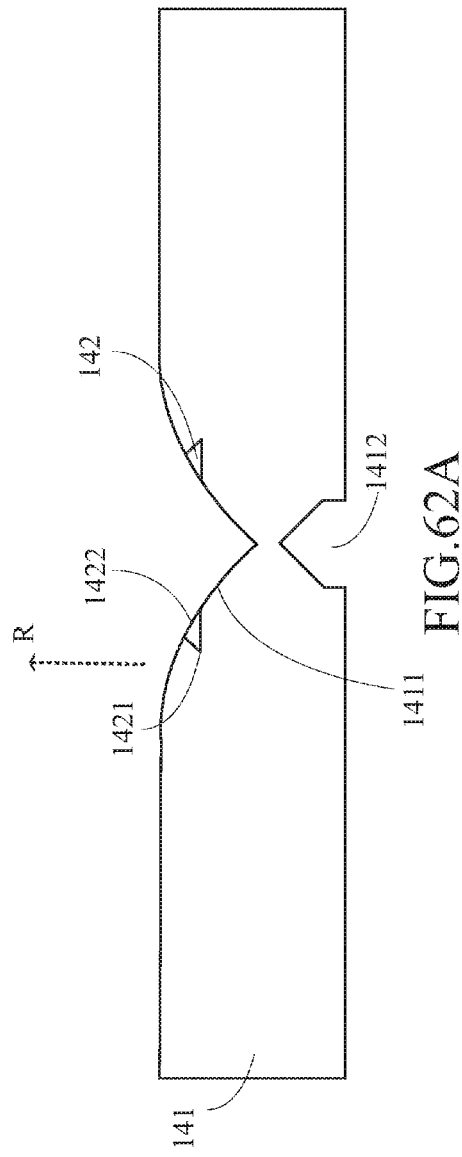
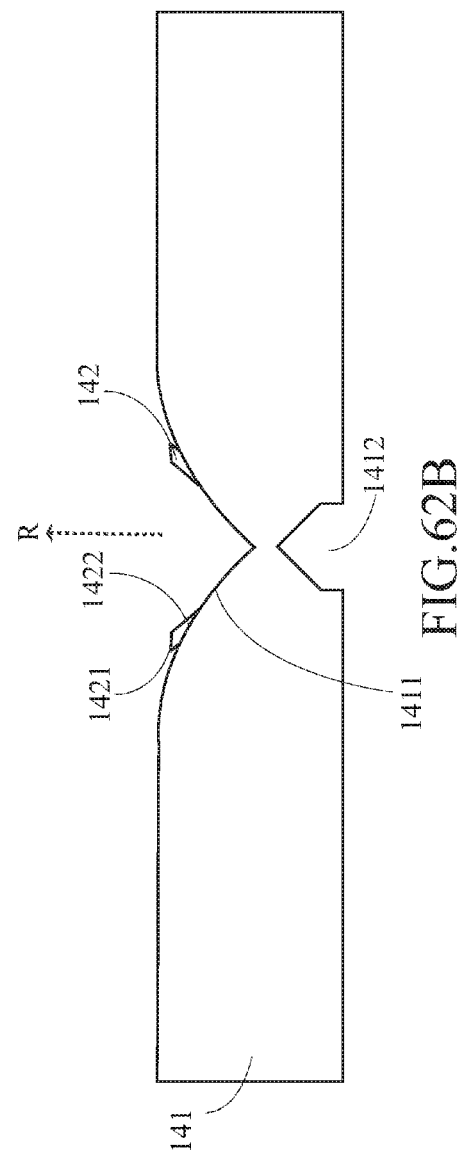

LIGHT CONVERTING OPTICAL STRUCTURE AND LIGHTING DEVICE UTILIZING THE SAME

FIELD

The present invention relates to a light accommodating optical structure, a light converting optical structure, and a lighting device. In particular, the present invention relates to a light converting optical structure and a light accommodating optical structure which are adapted to reduce the thickness of the lighting device.

BACKGROUND

Nowadays, flat lighting devices gradually employ light emitting diodes (LEDs) as the light sources to replace traditional incandescent or fluorescent light tubes. When the LEDs are employed as the light sources, they usually are directly disposed on the bottom area of the flat lighting device. The LED light sources would produce Lambertian lights, and the light intensity of the lights would be strongest at 90 degree, i.e. the vertical direction to the LEDs. So, the light output from the flat lighting device may be non-uniform, and local darkness, or local brightness, i.e. the weakest or strongest light intensity areas, will be observed.

To eliminate the local darkness or local brightness, a light diffusion structure is disposed in front of the LEDs with a certain distance therebetween. However, this kind of configuration will increase the overall thickness of the flat lighting device.

Another way of reducing the local darkness or local brightness is to increase the number of LED light source. However, this kind of configuration will result in the increase of the flat lighting device overall cost. Therefore, there remains a need for an improved lighting device.

SUMMARY

To solve the aforesaid problems, an objective of certain embodiments of the invention is to provide a light converting optical structure, which can produce a uniform light output within a thinner configuration.

The light converting optical structure comprises a light traveling layer, and a plurality of microstructures. The light traveling layer is transparent or translucent, and has a top conical recess formed on its top surface and a bottom conical recess formed on its bottom surface, where the bottom conical recess is located under the top conical recess. The microstructures are disposed on the top surface of the light traveling layer, including the surface of the top conical recess, and distributed in a way that the microstructures in the vicinity of the top conical recess has a sparser distribution whereas the microstructures away from the top conical recess has denser distribution.

Unlike traditional light guide plate used in edge-lit backlight module, since the microstructures in our case are disposed on both the top surface of the light traveling layer and the surface of the top conical recess, where the surface of the top conical recess is not on the same plane of the top surface of the light traveling layer, the distribution of the microstructures is essentially a three-dimensional distribution.

In this arrangement of the light converting optical structure, a light source can be located in the bottom conical recess, so that the overall configuration of the light source and the optical structure is compact.

Lights emitted from the light sources pass through the surface of the bottom conical recess, and enter the light traveling layer. The lights will reach the top surface of the light traveling layer, including the surface of the top conical recess. Lights do not run into the microstructures on the top surface will be totally reflected back by the top surface. Therefore, the lights can travel towards the peripheral region of the light traveling layer distant from the light source.

Moreover, because of the distribution of the microstructures, the lights closer to the light source have a smaller possibility to leave the light traveling layer, whereas lights more distant from the light source have a larger possibility to leave, thereby making the light output intensity of the light converting structure being uniform.

Further, because the half cone angle of the bottom conical recess is designed in view of the critical angle, the dimensions of the top and the bottom conical recesses could be minimized to induce total internal reflection for the lights in the light traveling layer. So, the overall thickness of the light guiding optical structure is reduced.

Another objective of certain embodiments of the invention is to provide a light accommodating optical structure which can adjust the large light emitting area to be smaller.

The light accommodating optical structure comprises a converting layer with one or more tapered through holes; that is, the hole has a small opening and a large opening. A light source, such as an LED, can be accommodated within the hole, and located at the larger opening. Lights emitted from the light source travel towards the small opening, and leave through the small opening. Because the small opening has an area smaller than the light emitting area of the light source, the lights are concentrated to leave the small opening, thereby reducing the light emitting area of the light source.

A further objective of certain embodiments of the invention is to provide a lighting device utilizing the abovementioned optical structures. The lighting device comprises a printed circuit board (PCB), at least one light source, and the aforesaid optical structure. The light source is electrically disposed onto the PCB, and the optical structure is disposed above the PCB. The bottom conical recess or the through hole of the optical structure accommodates the light source.

The lighting device can be utilized in various applications including LCD backlight modules, signboards, general lightings, light boxes, and etc.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 1 is a cross-sectional view showing a lighting device in accordance with a first embodiment of the present invention;

FIG. 2 is a cross-sectional view showing the light converting optical structure in accordance with the first embodiment of the present invention;

FIG. 7 is a cross-sectional view showing a lighting device in accordance with a second embodiment of the present invention;

FIG. 8 is a cross-sectional view showing a lighting device in accordance with a third embodiment of the present invention;

FIG. 9 is a cross-sectional view showing a lighting device in accordance with a fourth embodiment of the present invention;

FIG. 10 is a cross-sectional view showing a lighting device in accordance with a fifth embodiment of the present invention;

FIG. 11 is a cross-sectional view showing a lighting device in accordance with a sixth embodiment of the present invention;

FIG. 12 is a cross-sectional view showing a lighting device in accordance with a seventh embodiment of the present invention;

FIG. 13 is a cross-sectional view showing a lighting device in accordance with an eighth embodiment of the present invention;

FIG. 21 is a perspective view showing the lighting device in accordance with the fifteenth embodiment of the present invention;

FIG. 22 is a cross-sectional view showing a lighting device in accordance with a sixteenth embodiment of the present invention;

FIG. 23 is a cross-sectional view showing a lighting device in accordance with a seventeenth embodiment of the present invention;

FIG. 24 is a cross-sectional view showing a lighting device in accordance with an eighteenth embodiment of the present invention;

FIG. 25 is a cross-sectional view showing a lighting device in accordance with a nineteenth embodiment of the present invention;

FIG. 28 is a cross-sectional view showing a lighting device in accordance with a twenty-second embodiment of the present invention;

FIG. 29 is a cross-sectional view showing a lighting device in accordance with a twenty-third embodiment of the present invention;

FIG. 30 is a cross-sectional view showing a lighting device in accordance with a twenty-fourth embodiment of the present invention;

FIG. 33 is a cross-sectional view showing a non-uniform spot caused in the lighting device in accordance with the twenty-fifth embodiment of the present invention;

FIG. 34 is a cross-sectional view showing a lighting device in accordance with a twenty-sixth embodiment of the present invention;

FIG. 38 is a schematic view showing lights traveling in the light accommodating structure in accordance with the twenty-seventh embodiment of the present invention;

FIG. 39 is another schematic view showing lights traveling in the light accommodating structure in accordance with the twenty-seventh embodiment of the present invention;

FIG. 41 is schematic views showing lights trapped in the through hole of the light accommodating structure in accordance with the twenty-seventh embodiment of the present invention;

FIG. 49 is a cross-sectional view showing a lighting device in accordance with a thirty-third embodiment of the present invention;

FIG. 50 is a cross-sectional view showing a lighting device in accordance with a thirty-forth embodiment of the present invention;

FIG. 51 is a cross-sectional view showing a lighting device in accordance with a thirty-fifth embodiment of the present invention;

FIG. 52 is a cross-sectional view showing a lighting device in accordance with a thirty-sixth embodiment of the present invention;

FIG. 57 is a cross-sectional view showing a lighting device in accordance with a forty-first embodiment of the present invention;

FIG. 58 is a cross-sectional view showing a lighting device in accordance with a forty-second embodiment of the present invention;

FIGS. 59A to 59C are schematic views showing the steps of a method for manufacturing concave microstructures on a top conical recess of a light converting structure in accordance with a forty-third embodiment of the present invention;

FIGS. 60A to 60C are schematic views showing the steps of a method for manufacturing convex microstructures on a top conical recess of a light converting structure in accordance with a forty-forth embodiment of the present invention;

FIGS. 61A to 61D are schematic views respectively showing the microstructures able to be formed by the method in accordance with the forty-third or forty-forth embodiment of the present invention; and FIGS. 62A and 62B are schematic views respectively showing the microstructures failing to be formed by the method in accordance with the forty-third or forty-forth embodiment of the present invention.

DETAILED DESCRIPTION

Figure 3:
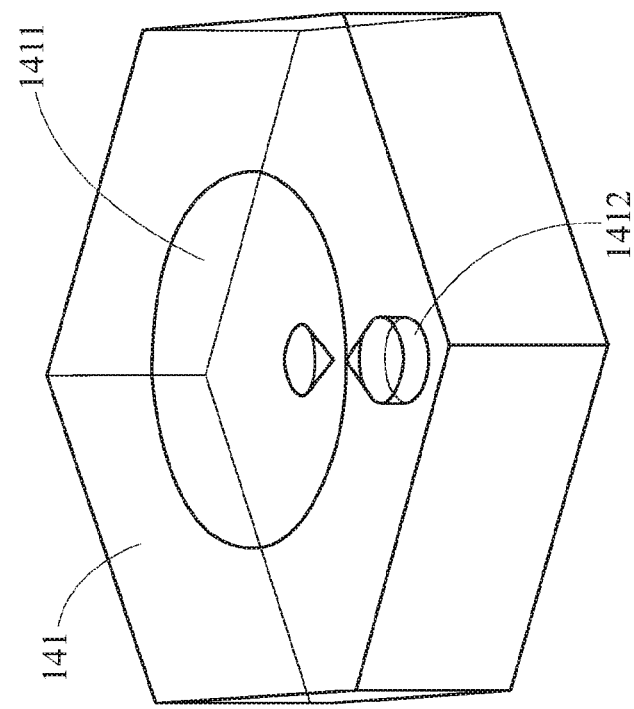
FIG. 3 is a perspective view showing the light converting optical structure in accordance with the first embodiment of the present invention.

In the following description, optical structures and a lighting device of the present invention are disclosed with reference to example embodiments thereof. It should be appreciated that these example embodiments are not intended to limit the present invention to any specific environment, example, embodiment, applications or particular implementations described in these embodiments. Therefore, the description of these embodiments is only for purposes of illustration rather than limitation.

First, please refer to FIG. 1, which is a cross-sectional view showing a lighting device in accordance with the first embodiment of the present invention. The lighting device 1 comprises a printed circuit board (PCB) 11, a light source 12, a reflective structure 13, and a light converting optical structure 14.

The PCB 11 is adapted to carry other components of the lighting device 1, and provide electricity to the light source 12. The PCB 11 comprises a substrate 111, a top conductor layer 112, a bottom conductor layer 113, and a via 114. The substrate 111 can be made of epoxy, metal, alloy, ceramic or polymer composites. The top conductor layer 112 and the bottom conductive layer 113 are respectively disposed on the top and bottom surfaces of the substrate 111, and each have a plurality of conductor lines (not shown) to form a specific circuit pattern. The via 114 is formed in the substrate 111 to electrically connect the top conductor layer 112 and the bottom conductor layer 113, so as to form a circuit. It is well known by the people skilled in the art that the PCB 11 can also comprise only the top conductor layer 112 to form a single layer circuit.

The light source 12 is adapted to emit lights. The light source 12 is disposed on the PCB 11 and is electrically connected to the top conductor layer 112 and bottom conductor layer 113. Electricity is applied from the top conductor layer 112 or bottom layer 113 to activate the light source 12. The light source 12 could be a wire bonded LED bare die or a flip chip bonded LED bare die or a commercial packaged SMD type LED. Moreover, the light source 12 may be a white LED, a red LED, a green LED, a blue LED, an amber LED, or a UV LED.

The reflective structure 13 is adapted to reflective lights. It could be also disposed on the PCB 11, and covers the PCB 11 except where the light source 12 locates. The reflective structure 13 can be made of a highly reflective material, such as a plastic (ex. PET, PP, PE, PVC, PC, PMMA, PU, PS, ABS, and etc.) with a white color coating or a metallic coating. As to the latter, the additional reflective coatings are formed by sputtering or thermal depositing with Al, Ag, Ni, Mo, Zn, Pt, Au, Cu or other metals and alloys. Moreover, the reflective structure 13 can also be made of a plastic containing reflective particles such as $TiO_2$, $CaCO_3$, $ZnO_2$, $SiO_2$, $Al_2O_3$, $SnO_2$ and $CeO_2$ particles or metallic particles, or air microvoids or a mixture of plurality types of particles. The fabrication process for the reflective structure 13 can be a molding process, an embossing process, a vacuum shaping process, and so on.

Please refer to FIGS. 2, and 3, which are a cross-sectional view and a perspective view showing the light converting optical structure in accordance with the first embodiment of the present invention. The light converting optical structure 14 can be referred as "light converting structure" for short, and it is adapted to uniformize lights emitted from the light source 12, thereby eliminating the local darkness or local brightness. The light converting structure 14 comprises a light traveling layer 141, and a plurality of microstructures 142.

The light traveling layer 141 is made of any type of transparent (or translucent) polymeric materials such as silicones, cyclic olefin copolymers (COC), polyurethane (PU), polystyrene (PS), polyester, polyethylene terephthalate (PET), polycarbonate (PC), fluorocarbon polymers, polyimide (PI), polyetherimide, polymethylmethacrylate (PMMA), acrylonitrile-butadiene-styrene copolymer (ABS), polyethylene (PE), polypropylene (PP) or a combination thereof. The light traveling layer 141 comprises a top conical recess 1411 on its top surface, and a bottom conical recess 1412 on its bottom surface, wherein the bottom conical recess 1412 is aligned with, i.e. located right under, the top conical recess 1411, and the apexes (tips) of the top and bottom conical recesses are on the vertical phantom line X (shown in FIG. 4). The light traveling layer 141 is disposed on the reflective structure 13, and the light source 12 is accommodated within the bottom conical recess 1412.

The surface of the top conical recess 1411 is designed under the concept of edge-ray principle and referred to a compound parabolic concentrator (CPC), so that the surface has a gradually varied, i.e. continuously changed, slope which makes the lights totally reflected thereon.

Figure 4:
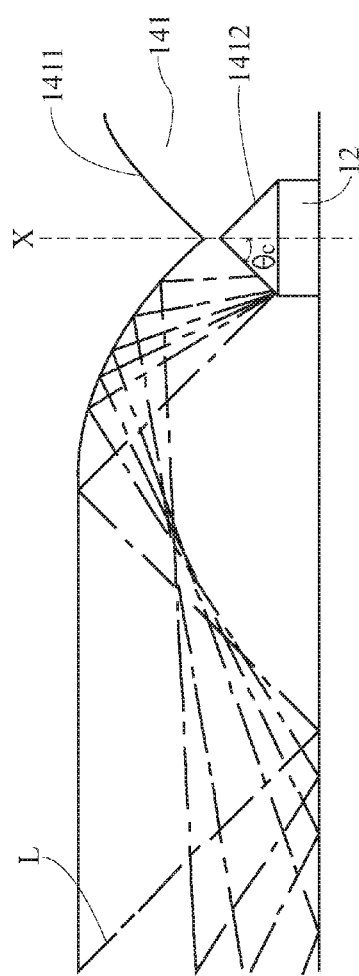
FIG. 4 is a schematic view showing lights traveling in the light traveling layer in accordance with the first embodiment of the invention.

Please refer to FIG. 4, which is a schematic view showing lights traveling in the light traveling layer 141 in accordance with the first embodiment of the invention. For example, lights L are emitted from the edge of the light source 12, and then pass through the surface of the bottom conical recess 1412. The lights L are refracted at the surface of the bottom conical recess 1412. After that, the refracted lights L reach the surface of the top conical recess 1411. Because the incident angles of the lights L to the surface of the top conical recess 1411 are larger than the critical angle of the light traveling layer 141, the lights L will be totally reflected on that surface.

The reflected lights L will then travel towards the peripheral region distant from the light source 12. Some of the reflected lights will reach the bottom surface of the light traveling layer 141, and totally reflected as well since the incident angles of those lights L in view of the bottom surface are still larger than the critical angle of the light traveling layer 141. (Note that, some of the reflected lights L reached the light traveling layer 141 may leave the bottom surface and then reflected back into the light traveling layer 141 by the reflective structure 13.) It is known that the critical angle of the light traveling layer 141 is obtained from the Snell's law, and related to the refractive indices of the light traveling layer 141 and the medium, such as air.

It is noted that the cone angle of the bottom conical recess 1412 affects the dimensions of the top conical recess 1411. When the half cone angle $\theta_c$ of the bottom conical recess 1412 is closed to the critical angle of the light traveling layer 141, the thickness of the light traveling layer 141 could be minimized.

Figure 5:
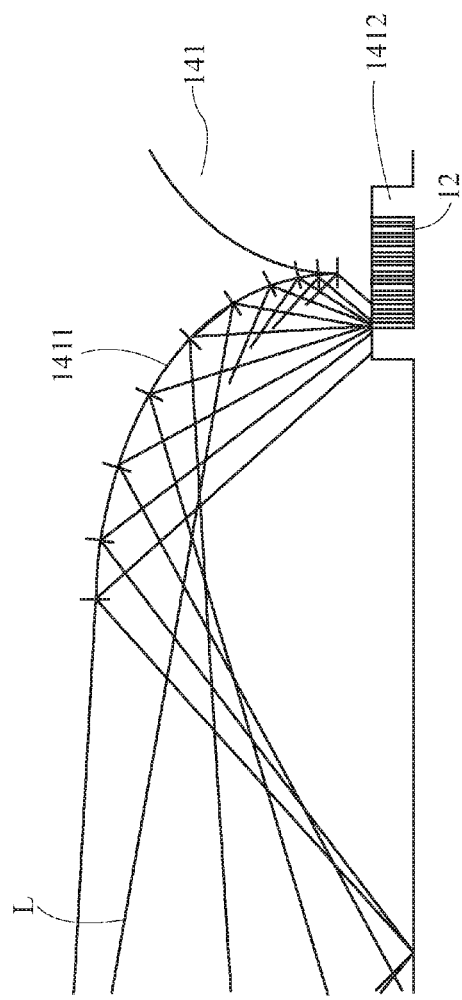
FIG. 5 is a schematic view showing lights traveling in the light traveling layer when the half cone angle of the bottom conical recess is 90°.

Please refer to FIG. 5, which is a schematic view showing lights traveling in the light traveling layer when the half cone angle $\theta_c$ of the bottom conical recess is 90°. In that angle, the bottom conical recess 1412 is substantially a cylindrical groove. The lights L emitted from the light source 12 still are totally reflected by the surface of the top conical recess 1411, and then travel to the regions remote from the light source 12. However, the height and radius of the top conical recess 1411 may need to be enlarged to sufficiently cover the lights L directly emitted from the light source 12.

Figure 6:
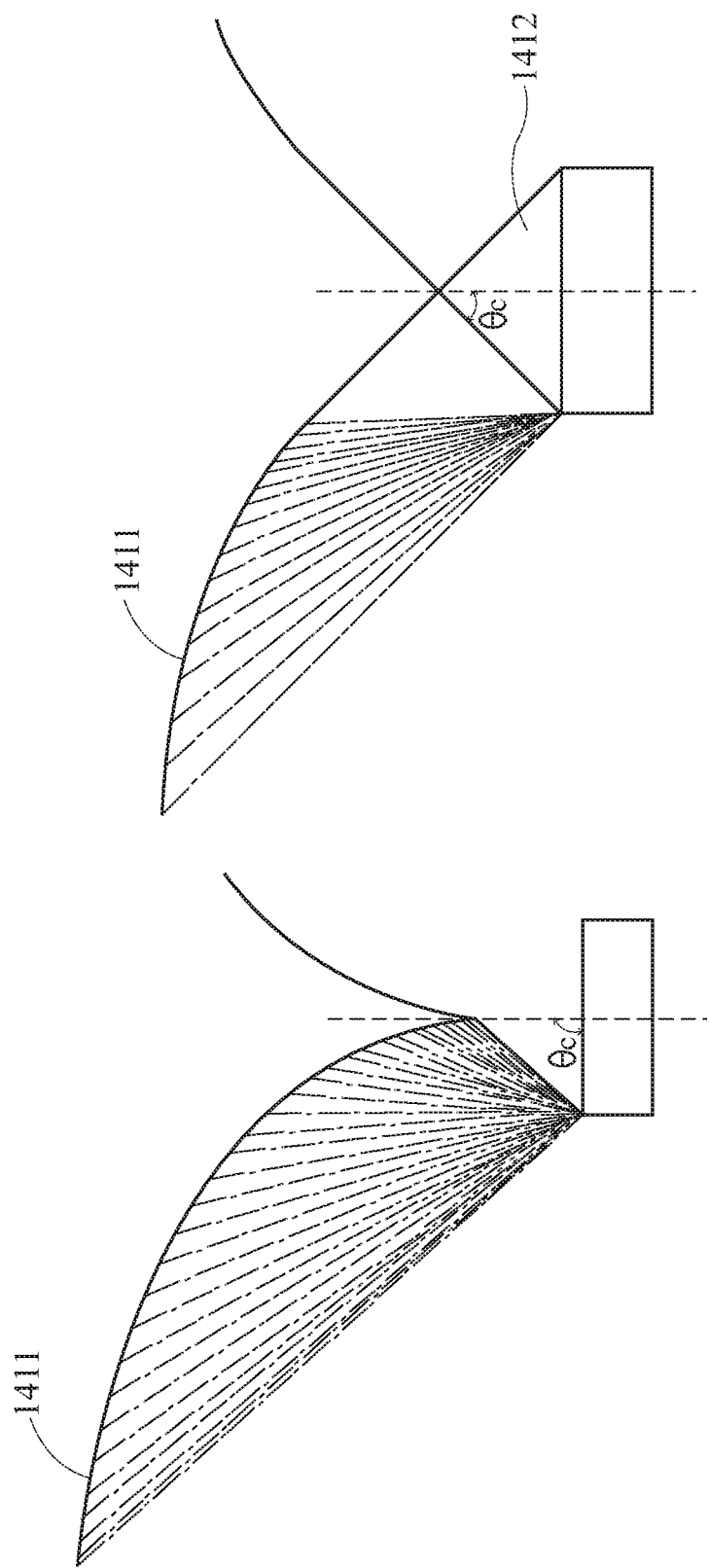
FIG. 6 is schematic views showing the comparison between the light traveling layers with the different half cone angles.
Figure 14:
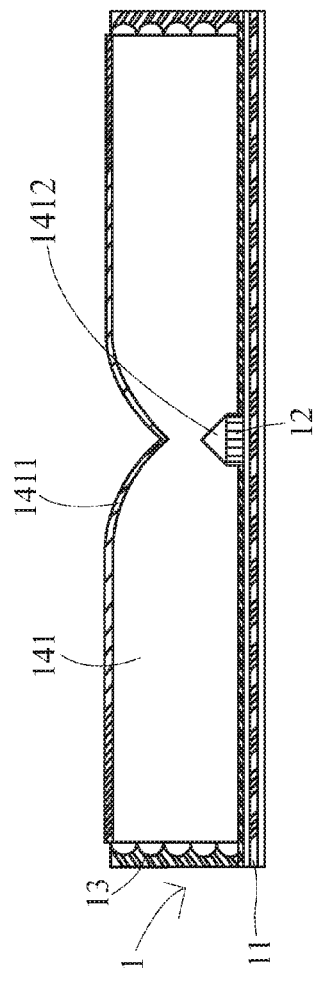
FIG. 14 is a cross-sectional view showing a lighting device in accordance with a ninth embodiment of the present invention.
Figure 15:
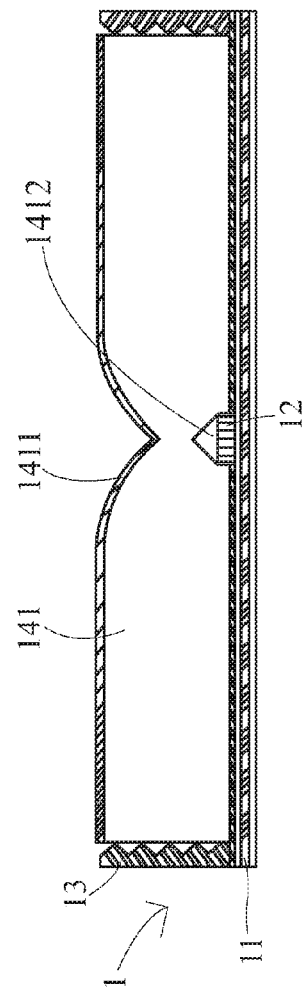
FIG. 15 is a cross-sectional view showing a lighting device in accordance with a tenth embodiment of the present invention.

Please refer to FIG. 6, which includes schematic views showing the comparison between the light traveling layers with the different half cone angles $\theta_c$. It is obvious that the light traveling layers 141 reflect lights on the surfaces of the top conical recesses 1411 respectively. However, the light traveling layers 141 with the half cone angle $\theta_c$ equal to the critical angle (the right one) is thinner than that with the half cone angle $\theta_c$ of 90°, which is not equal to the critical angle.

Please refer to FIGS. 1 to 3 again, the microstructures 142 of the light guiding structure 14 are described as below.

The microstructures 142 are adapted to frustrate (or prevent) the total internal reflection. They are disposed on the top surface of the light traveling layer 141, including the surface of the top conical recess 1411, and have a non-uniform distribution. It is worth to mention that the microstructures 142 can also be disposed on both the top surface and the bottom surface of the light traveling layer 141, which may further enhance the overall light output uniformity of the lighting device 1. The microstructures 142 are distributed in a sparser manner at the region closer to (the tip of) the top conical recess 1411, while the microstructures 142 are distributed in a denser manner at the region away from the top conical recess 1411.

The microstructures 142 may be recessed structures, protruded structures which are integrally formed with the light traveling layer 141 such as by injection molding, embossing, stamping or imprinting methods, or ink materials printed on the light traveling layer 141. Alternatively, the microstructure 142 can also be made by printing or coating an ink (or paste) material containing transparent or translucent particles such as polymer, glass, $SiO_2$ or ceramic particles on the light traveling layer 141 where the areas having the ink (or paste) will have un-even surface (in the other word, a certain surface roughness) to alter the light path, therefore, allow lights to escape out of the light traveling layer 141.

It is worth to note that the microstructure may or may not be on the same plane. For example, when the microstructure is disposed in the top conical recess 1411 area, where the surface is declined toward the center of the conical recess, the relative height of the microstructure is different from the microstructure on the rest of the surface of the light traveling layer 141. Therefore, a three-dimensional distribution of the microstructure will be needed to enhance the light output uniformity from the light converting structure.

When the lights emitted from the light source 12 reach the microstructures 142, the incident angles of the lights will be varied. The lights may leave or scatter out rather than be reflected back to the light traveling layer 141. In view of this phenomenon and the distribution of the microstructures 142, the light will be highly probable to be total-internal-reflected rather than leaving the light traveling layer 141 at the area closer to the light source 12; whereas the light will be highly probable to refract out the rather than being total-internal-reflected at the area distant from the light source 12. Therefore, the light output intensity of the light converting structure 14 can be more uniform, thereby providing a uniform light output.

It is noted that there are reflective structures 13 disposed on the two lateral surfaces of the light traveling layer 141, in order to prevent lights from leaving the light traveling layer 141 through the lateral surfaces.

The following is the description of other embodiments of the present invention. For the conciseness, the components, such as the PCB and the light source, similar to those in the first embodiment are not repeatedly described in detail hereinafter.

Please refer to FIGS. 7 to 9, which are cross-sectional views showing lighting devices in accordance with the second to fourth embodiments of the present invention. Compared with the first embodiment, each of the bottom conical recesses 1412 in these embodiments has an enlarged lower portion, so that the bottom conical recesses 1412 may accommodate different types of LED light sources including wire bonded LED dies and multiple LED light sources.

Please refer to FIG. 10, which is a cross-sectional view showing a lighting device in accordance with the fifth embodiment of the present invention. In this embodiment, the light device 1 further comprises a light spreading structure 15 adapted to increase light emitting range. The light spreading structure 15 has a configuration corresponding to the bottom conical recess 1412, i.e. conical shape, and is made of transparent or translucent materials, such as acrylic. The light spreading structure 15 is accommodated within the bottom conical recess 1412, and covers the light source 12. The lights emitted from the light source 12 passing through the light spreading structure 15 will be spread, so the lights will enter the traveling layer 141 in a wider angle and a larger range.

Please refer to FIG. 11, which is a cross-sectional view showing a lighting device in accordance with a sixth embodiment of the present invention. In this embodiment, the light traveling layer 141 has a batwing-shaped top surface, which can increase the light emitting range when lights pass through the batwing-shaped top surface.

Please refer to FIGS. 12 to 15, which are cross-sectional views showing a lighting device in accordance with the seventh to tenth embodiments of the present invention. In these embodiments, the reflective structures 13 disposed on the lateral surfaces of the light traveling layer 141 may have various configurations. In view of their cross-sections, the reflective structures 13 could be a cambered structure, a continuous protrude structure, a continuous recessed structure, or a continuous jagged structure. The reflective structures 13 all utilized to diffuse or reflect the lights at the lateral surfaces of the light traveling layer 141.

Figure 16:
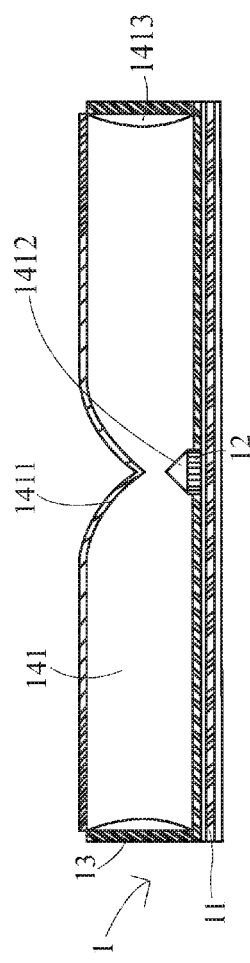
FIG. 16 is a cross-sectional view showing a lighting device in accordance with an eleventh embodiment of the present invention.
Figure 17:
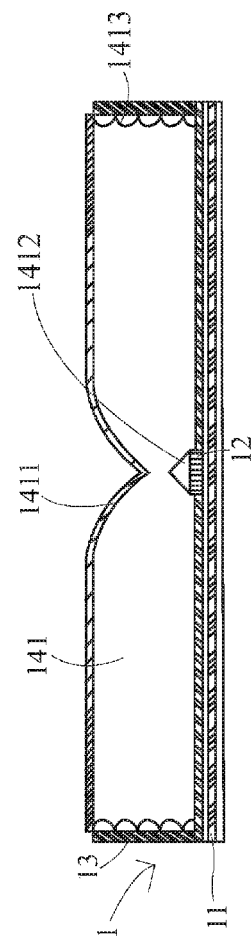
FIG. 17 is a cross-sectional view showing a lighting device in accordance with a twelfth embodiment of the present invention.
Figure 18:
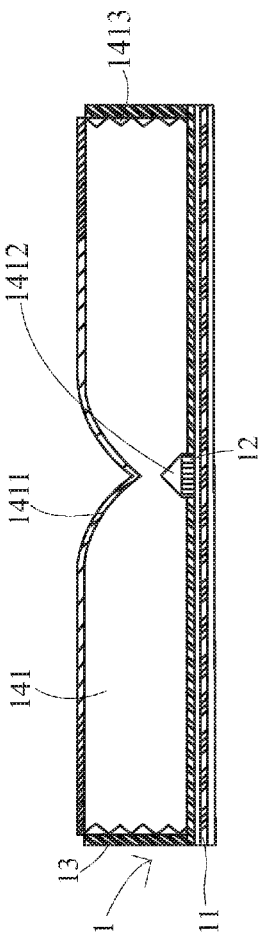
FIG. 18 is a cross-sectional view showing a lighting device in accordance with a thirteenth embodiment of the present invention.

Please refer to FIGS. 16 to 18, which are cross-sectional views showing a lighting device in accordance with the eleventh to thirteenth embodiments of the present invention. The light traveling layers 141 in those embodiments have non-flat lateral surfaces. As shown in the figures, one or more than one groove 1413 is formed on the lateral surfaces of the light traveling layers 141. Thus, the lateral surfaces of the light traveling layers 141 has the configuration of a cambered structure, a continuous recessed structure, or a continuous jagged structure for diffusing the light.

Figure 19:
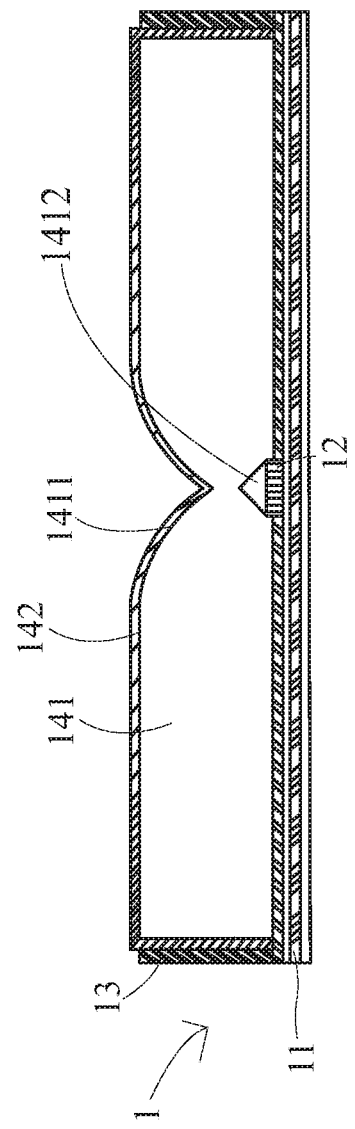
FIG. 19 is a cross-sectional view showing a lighting device in accordance with a fourteenth embodiment of the present invention.

Please refer to FIG. 19, which is a cross-sectional view showing a lighting device in accordance with the fourteenth embodiment of the present invention. In this embodiment, the microstructures 142 are further formed on the lateral surfaces of the light traveling layer 141. Those microstructures 142 can redirect the lights, and help the lights diffuse.

The abovementioned embodiments relate to the light traveling layers 141 with one set of the top conical recess 1411 and bottom conical recess 1412. In the following embodiments, a traveling layer having plural top and bottom conical recesses will be disclosed.

Figure 20:
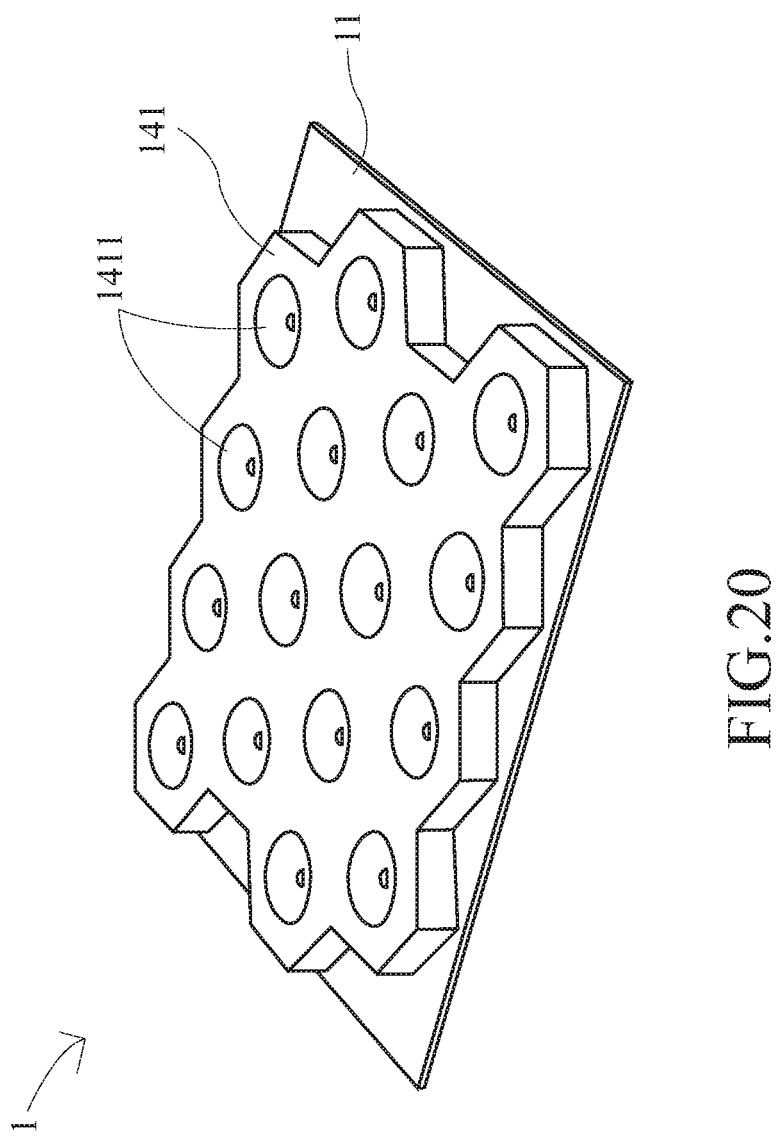
FIG. 20 is a perspective view showing a lighting device in accordance with a fifteenth embodiment of the present invention.

Please refer to FIGS. 20 and 21, which are a cross-sectional view and a perspective view showing a lighting device in accordance with the fifteenth embodiment of the present invention. In comparison to the first embodiment, the lighting device 1 in this embodiment comprises a plurality of light sources 12 which can be individually or concurrently activated to emit lights. The traveling layer 141 comprises a plurality of top conical recesses 1411, and a plurality of bottom conical recesses 1412. The light sources 12 are respectively accommodated within the bottom conical recesses 1412. The top conical recess 1411 and the bottom conical recess 1412 are able to uniformize the light distributions so that the lighting device 1 can provide a surface light output in a thin configuration.

Please refer to FIG. 22, which is a cross-sectional view showing a lighting device in accordance with the sixteenth embodiment of the present invention. The light traveling layer 141 further has at least one interval triangular trench 1414 formed on its bottom surface, and between the two adjacent light sources 12, namely between the two adjacent bottom conical recesses 1412. The interval triangular trench 1414 is utilized to reflect the lights.

The objective of the interval triangular trench 1414 is to reduce the cross-talk between adjacent lighting blocks during 2D local dimming actions. For example, the right light source 12 is activated to emit lights, but the left one is shut off. By the total internal reflection at the top conical recess 1411, the lights will laterally travel toward the interval triangular trench 1414. Most of the lights reaching on the surface of the interval triangular trench 1414 will be reflected back, so that the right portion of the light guiding structure 1 with respect to the right light source 12 will be much brighter than the left portion. Therefore, the cross-talk between the two adjacent light blocks can be reduced.

Please refer to FIG. 23, which is a cross-sectional view showing a lighting device in accordance with the seventeenth embodiment of the present invention. Compared with the sixteenth embodiment, the surface of the interval triangular trench 1414 is formed with a reflective layer 13, in order to increase the reflectivity of the interval triangular trench 1414. So, lights can be firmly reflected at the reflective layer 13 of the interval triangular trench 1414.

Figure 26:
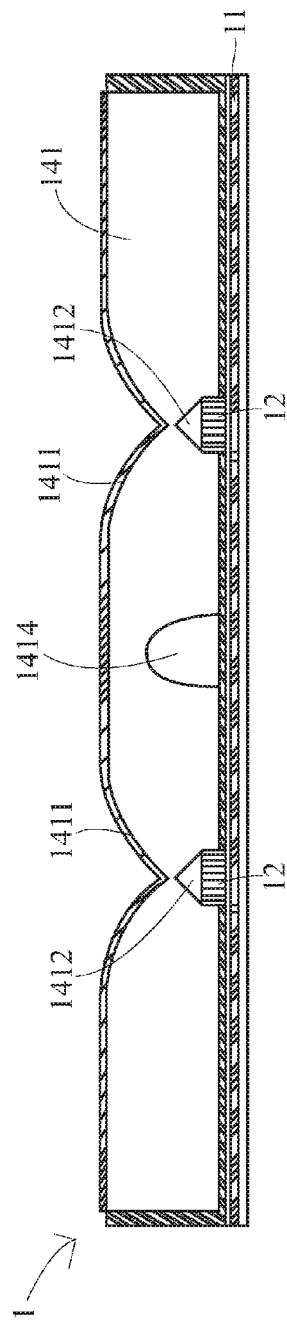
FIG. 26 is a cross-sectional view showing a lighting device in accordance with a twentieth embodiment of the present invention.
Figure 27:
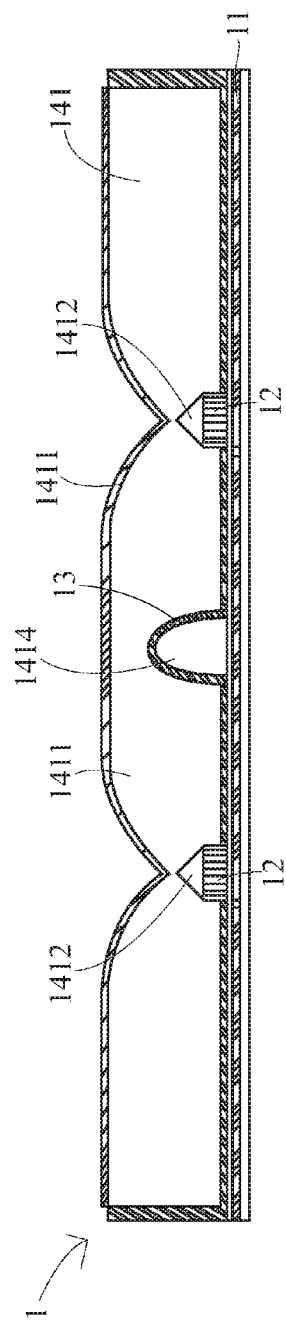
FIG. 27 is a cross-sectional view showing a lighting device in accordance with a twenty-first embodiment of the present invention.

Please refer to FIGS. 24 to 25, which are cross-sectional views showing a lighting device in accordance with the eighteenth and nineteenth embodiments of the present invention. The interval triangular trenches 1414 in these embodiments have a curved surface. The interval triangular trench 1414 shown in FIG. 25 is further formed with a reflective layer 13. Thus, the lights reflected at the interval triangular trench 1414 could subsequently travel along the desired path due to the configuration of the interval triangular trench 1414. Please refer to FIGS. 26 to 27, which are cross-sectional views showing a lighting device in accordance with the twentieth and twenty-first embodiments of the present invention. The interval trench 1414 shown in FIG. 26 is bowl-shaped, or dome-shaped, whereas the interval trench 1414 shown in FIG. 27 is further formed with a reflective layer 13.

Please refer to FIGS. 28 to 30, which are cross-sectional views showing a lighting device in accordance with the twenty-second to twenty-fourth embodiments of the present invention. The interval trenches 1414 in these embodiments are disposed on the top surface of the light traveling layer 141. As shown in the figures, the interval trench 1414 is formed with various shapes.

Figure 31:
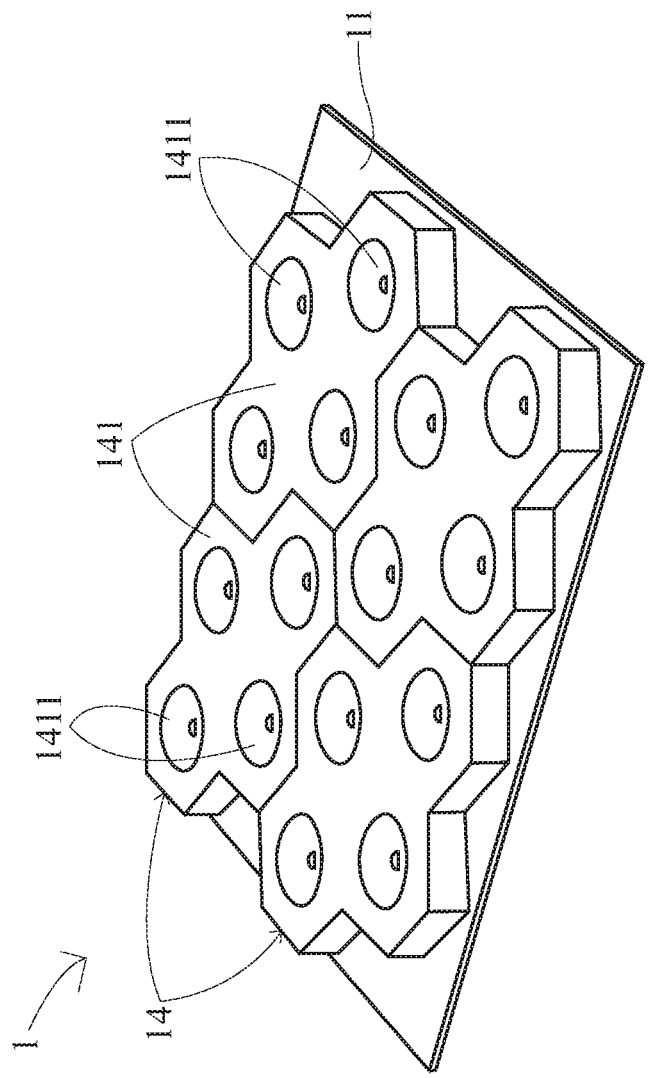
FIG. 31 is a perspective view showing a lighting device in accordance with a twenty-fifth embodiment of the present invention.
Figure 32:
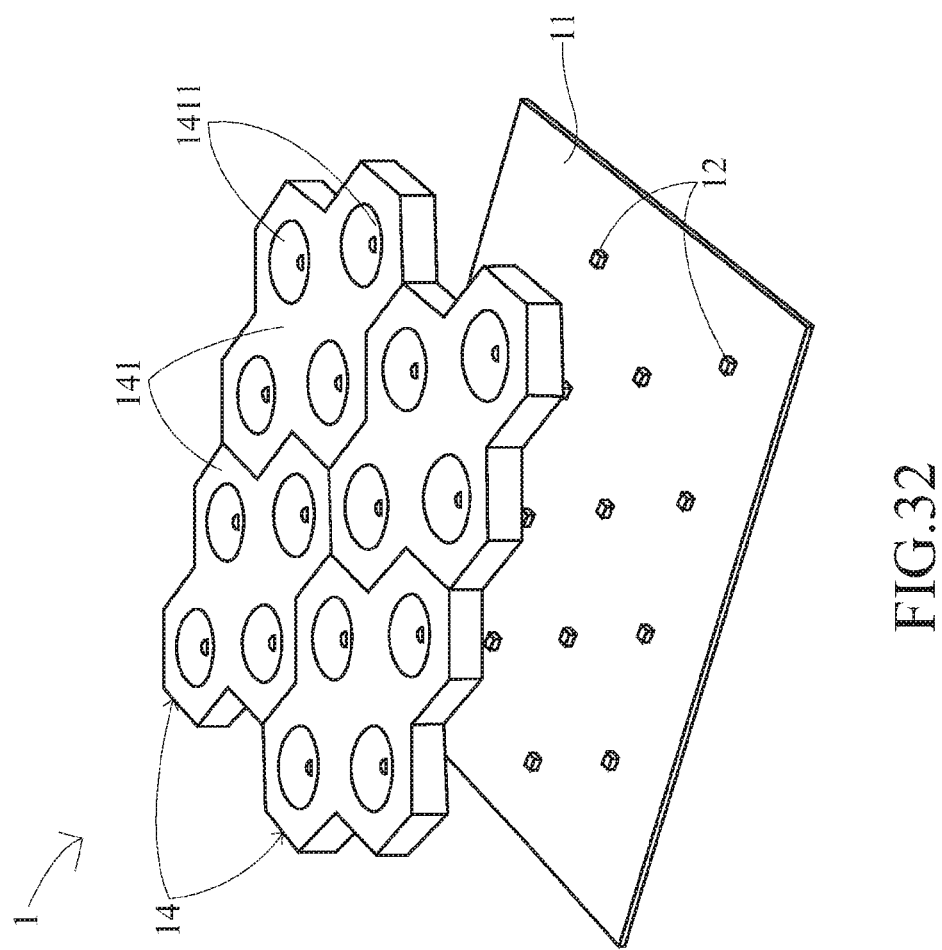
FIG. 32 is a perspective view showing the lighting device in accordance with the twenty-fifth embodiment of the present invention.

Please refer to FIGS. 31 and 32, which are perspective views showing a lighting device in accordance with the twenty-fifth embodiment of the present invention. The lighting device 1 of this embodiment is similar to that of fifteenth embodiment. The present embodiment discloses that the light converting structure 14 including a plurality of the light traveling layers 141, and the lighting device 1 is formed by assembling with a plurality of light converting structures 14.

To be more specific, the lighting device 1 of this embodiment comprises a plurality of light converting structures 14 disposed on the PCB 11. The light converting structures 14 are adapted to be assembled with each other. Each of the light converting structures 14 has a plurality of top conical recesses 1411 and a plurality of bottom conical recesses 1412. Each of the bottom conical recesses 1412 is utilized to accommodate the light sources 12. In this way, a large sized lighting converting structure can be obtained by assembling several small sized light converting structures 14.

It is understandable that the light converting structures 14 can only have one set of the top and bottom conical recesses (not shown in the figures).

Please refer to FIG. 33, which is a schematic view showing a non-uniform spot caused in the lighting device in accordance with the twenty-fifth embodiment of the present invention. The light converting structures 14 are assembled with each other, so that an air gap may exist between the light converting structures 14. When light reaches the air gap, the traveling path would be altered. The light reflected or scattered at the air gap may cause the brightness spot or dark spot. Thus, the phenomenon will cause dark or bright spot, and the non-uniformity.

As shown in FIG. 34, to eliminate the abovementioned problem, a transparent (or translucent) material 16, such as glue, is applied in the air gap between the two adjacent light converting structures 14. The transparent material 16 has a refractive index closed (preferably identical) to the refractive index of the light traveling layers 141, so the light can pass through the gap without too much reflection or scattering.

The abovementioned embodiments are related to the light converting optical structure and the lighting device utilizing the same, and share a general specific feature among the light converting optical structures.

Figure 35:
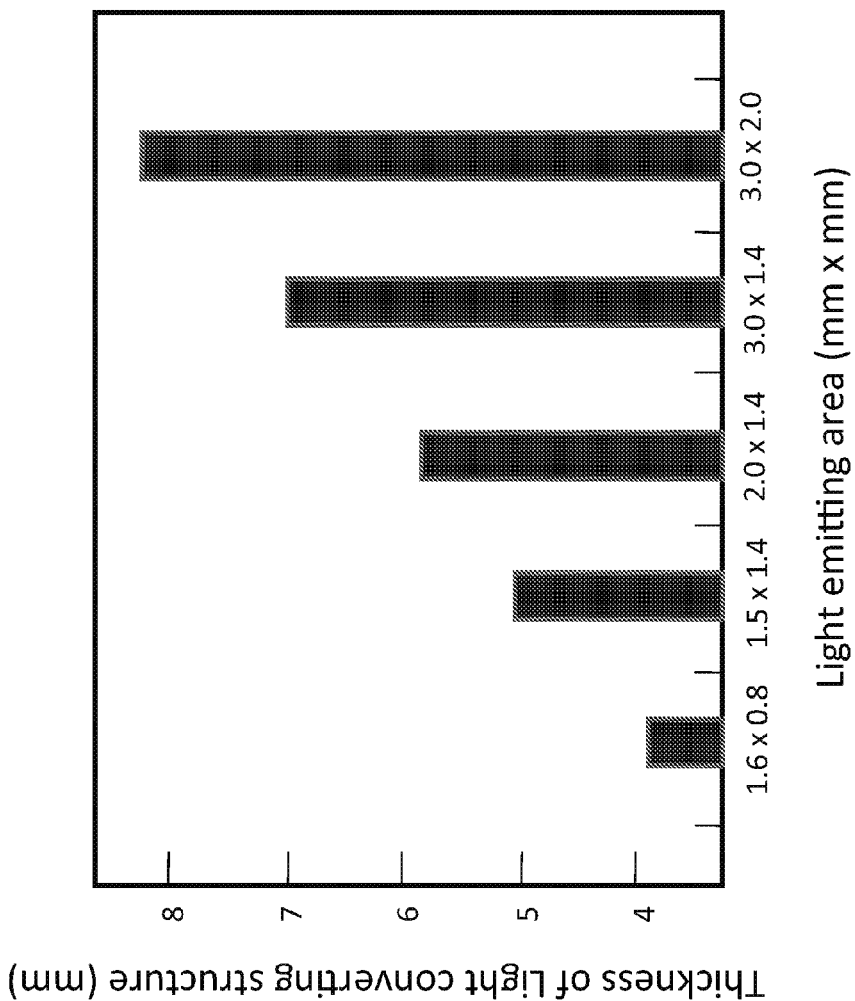
FIG. 35 is a schematic view showing a simulation result with regard to the thickness of a light converting structure at different light emitting dimensions in accordance with one of above embodiments of the present invention.

Please refer to FIG. 35, which is a schematic view showing a simulation result with regard to the thickness of the light converting structure at different light emitting dimensions based on one of the above embodiments. This simulation indicates that in order to reduce the thickness of the light converting structure (namely, the thickness of the lighting device), it is important to have a small emitting area. However, it is well known by the people skilled in this field that the LED die having stronger light luminance usually have a larger emitting area.

Therefore, in order to provide the light converting structure having a small thickness along with strong light luminance, another new optical structure is disclosed hereinafter to be in combination with the light converting structure.

In the following example embodiments, other optical structures will be introduced, along with a method for manufacturing the same.

Figure 36:
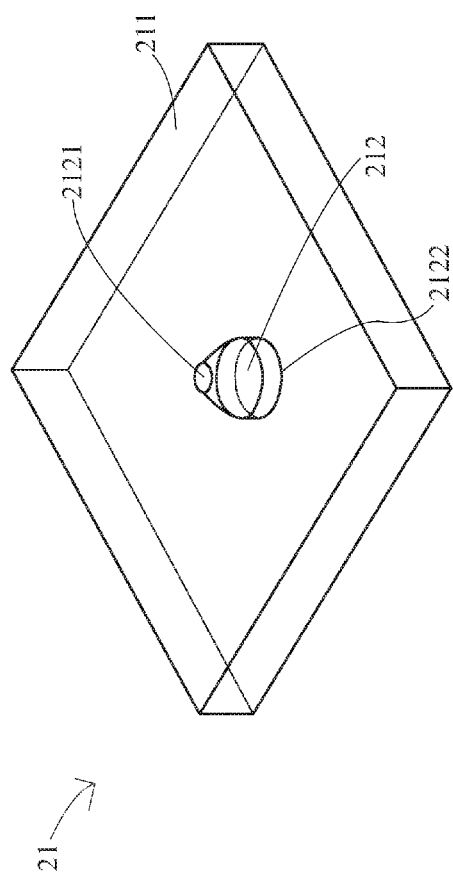
FIG. 36 is a perspective view showing a lighting device in accordance with a twenty-seventh embodiment of the present invention.
Figure 37:
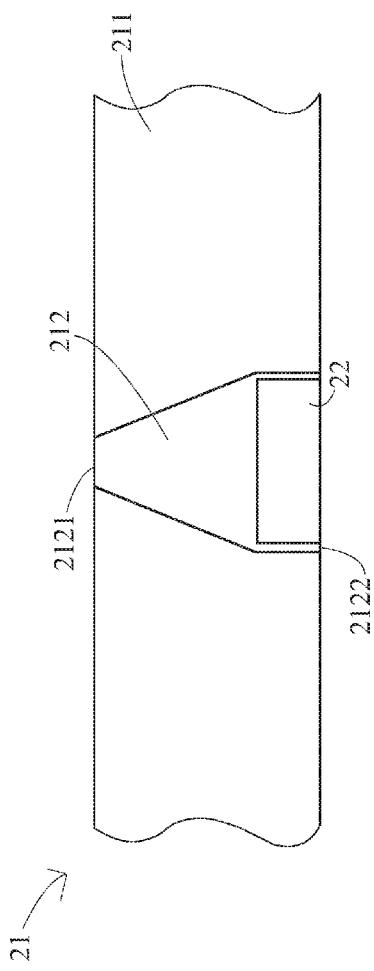
FIG. 37 is a cross-sectional view showing the lighting device in accordance with the twenty-seventh embodiment of the present invention.

Please refer to FIGS. 36 and 37, which are respectively a perspective view and a cross-sectional view showing a light accommodating optical structure in accordance with the twenty-seventh embodiment of the present invention. The light accommodating optical structure 21, or light accommodating structure 21 for short, comprises a light accommodating layer 211 having one or more than one through tapered holes 212. In this embodiment, the light accommodating layer 211 has one through hole 212. The light accommodating layer 21 are made by injection molding, embossing, mechanical punching or other available methods. The through hole 212 has a small top opening 2121 and a large bottom opening 2122 opposite to the small opening 2121.

The inner surface of the through hole 212 is highly reflective, which can be either from the material of the light accommodating layer 211 itself made of a plastic containing reflective particles such as $TiO_2$, $CaCO_3$, $ZnO_2$, $SiO_2$, $Al_2O_3$, $SnO_2$ and $CeO_2$ particles or metallic particles, or air microvoids or a mixture of plurality types of particles, or from forming an additional reflective coating, such as a plastic (ex. PET, PP, PE, PVC, PC, PMMA, PU, PS, ABS, and etc.) with a white color coating or a metallic coating. As to the latter, the additional reflective coatings are formed by sputtering or thermal depositing with Al, Ag, Ni, Mo, Zn, Pt, Au, Cu or other metals and alloys. Moreover, the reflective coating can also be made of a plastic containing reflective particles such as $TiO_2$, $CaCO_3$, $ZnO_2$, $SiO_2$, $AlOSnO_2$ and $CeO_2$ particles or metallic particles, or air microvoids or a mixture of plurality types of particles.

A light source 22, such as a LED chip, can be, operatively, accommodated within the through hole 212, and located at the large opening 2122. The light emitting area of the light source 22 is smaller than or equal to that of the large opening 2122, and is greater than the small opening 2121.

Please also refer to FIG. 38, which is a schematic view showing lights traveling in the light accommodating structure in accordance with the twenty-seventh embodiment of the present invention. The lights L are emitted from the light source 22. Some lights L are reflected in the through hole 212, and then leave the through hole 212 at the small opening 2121; whereas some lights L are directly leave the through hole 212 from the small opening 2121.

Obviously, the lights outputted from the small opening 2121 has a light emitting area much smaller than that of the light source 12. In other words, the light accommodating structure 21 operatively replace the emitting area of the light source 22 with a smaller one. When the light emitting area is reduced, the top conical recess 1411 for providing the first total internal reflection is also minimized. Conceivably, the thickness of the light converting structure could be slimed in view of the top conical recess 1411 being minimized.

Figure 40:
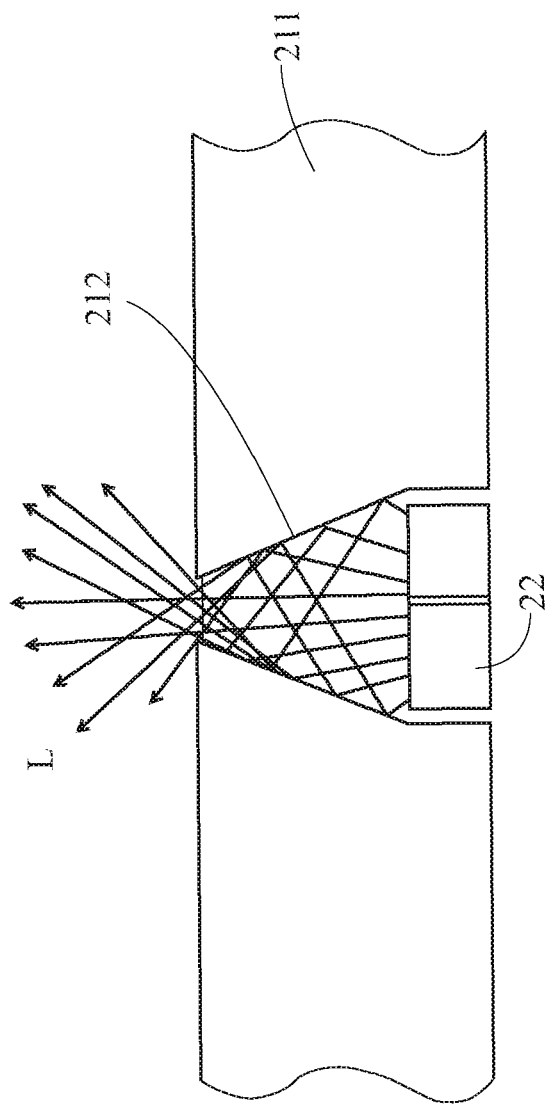
FIG. 40 is a further schematic view showing lights traveling in the light accommodating structure in accordance with the twenty-seventh embodiment of the present invention.

Please refer to FIGS. 39 and 40, which are schematic views showing lights traveling in the light converting structure in accordance with the twenty-seventh embodiment of the present invention. In FIG. 39, the through hole 212 accommodates a light source 22 which can emit lights with several different colors, such as red, green, and blue. The light source 22 may be three individual R, G, and B LEDs, or one LED containing three R, G, and B LED dies. The lights could be mixed within the through hole 212 to form a specific color, and projected from the small opening 2121. For example, the red, blue, and green lights can be mixed to obtain a white light.

In FIG. 40, the through hole 212 accommodates a light source 22 which can emit lights with specific color temperatures. The light source 22 may be a white LED with a blue LED, or an amber LED. The lights could be mixed with each other in the through hole 212, thereby adjusting the color temperature of the light projected from the small opening 2121.

Please refer to FIG. 41, which is schematic views showing lights trapped in the through hole 212 of the light accommodating structure in accordance with the twenty-seventh embodiment of the present invention. The through hole 212 is a half-cone shaped hole with a small opening 2121 on the top. The lights emitted from the light source 22 will be trapped, i.e. repeatedly reflected, in the through hole 212 and projected from the small opening 2121. The through hole 212 narrows down the light emitting area so that the top conical recess 1411 mentioned in the previous embodiment could be minimized and the thickness of the light traveling layer 141 could be slimed.

Figure 42:
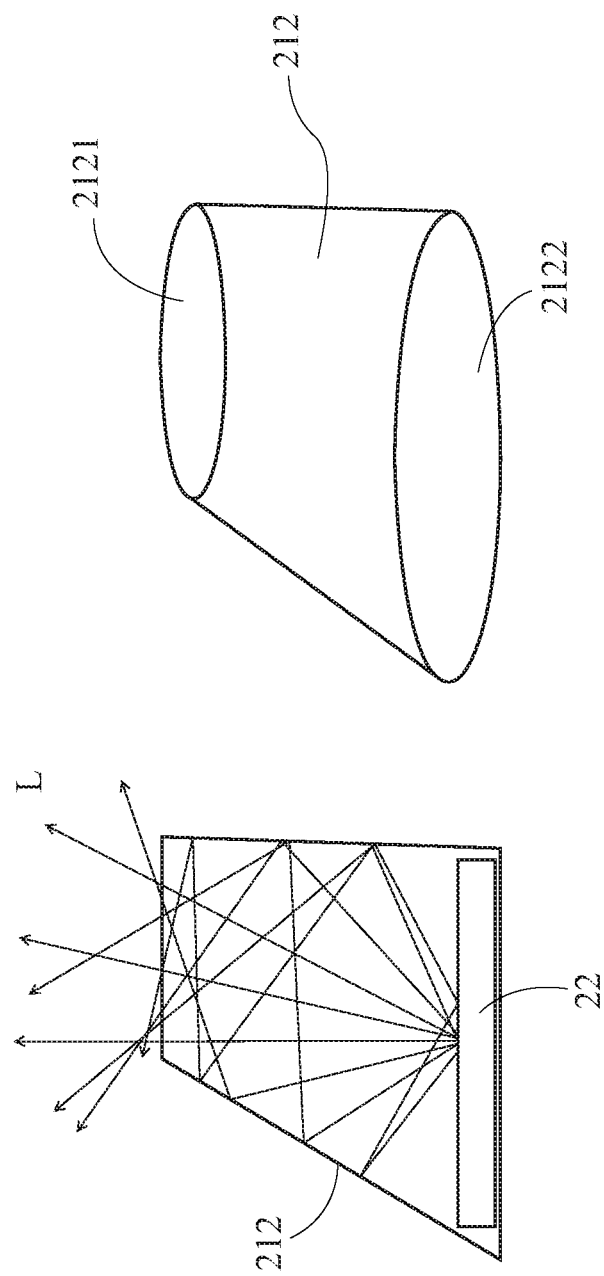
FIG. 42 is schematic views showing a light accommodating structure in accordance with a twenty-eighth embodiment of the present invention.

Please refer to FIG. 42, which is a cross-sectional view showing a light accommodating structure in accordance with the twenty-eighth embodiment of the present invention. The through hole 212 of this embodiment is still an asymmetric half-cone shaped hole. The through hole 212 also operatively narrows down the light emitting area at the small opening 2121.

Figure 43:
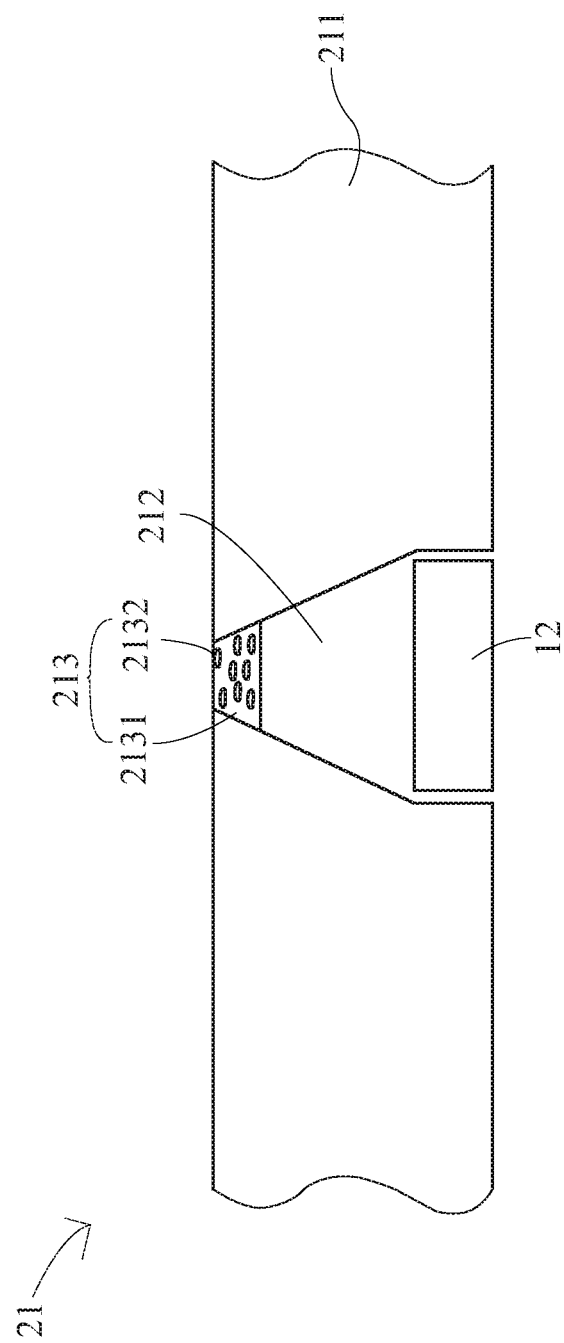
FIG. 43 is a cross-sectional view showing a light accommodating structure in accordance with a twenty-ninth embodiment of the present invention.

Please refer to FIG. 43, which is a cross-sectional view showing a light accommodating structure in accordance with the twenty-ninth embodiment of the present invention. Compared to the twenty-sixth embodiment, the light accommodating structure 21 in this embodiment further comprises a phosphor layer 213 adapted to transfer the light into the white light. The phosphor layer 213 is applied in the through hole 212 and located at the small opening 2121, where the light projected therefrom. The phosphor layer 213 may include a binder 2131, such as polymer resin, and a plurality of phosphor particles 2132 formed within the binder 2131.

The light source 22 is disposed at the large opening 2122 of the through hole 22. Lights emitted from the light source 22 leaving the through hole 2122 have to pass the phosphor layer 213, and thereby being transformed into white light through the phosphor particles 2132.

Figure 44A:
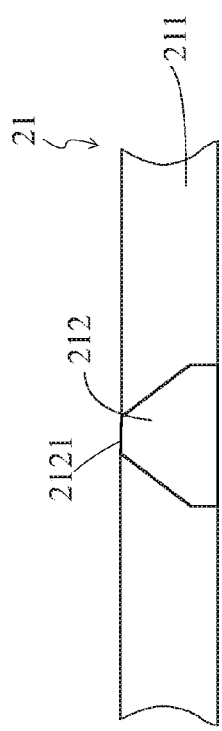
FIGS. 44A to 44D are schematic views showing the steps of a method for manufacturing a light accommodating structure in accordance with a preferred embodiment of the present invention.
Figure 44B:
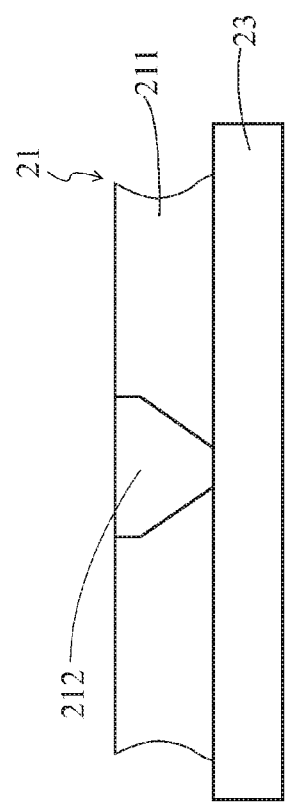
Figure 44C:
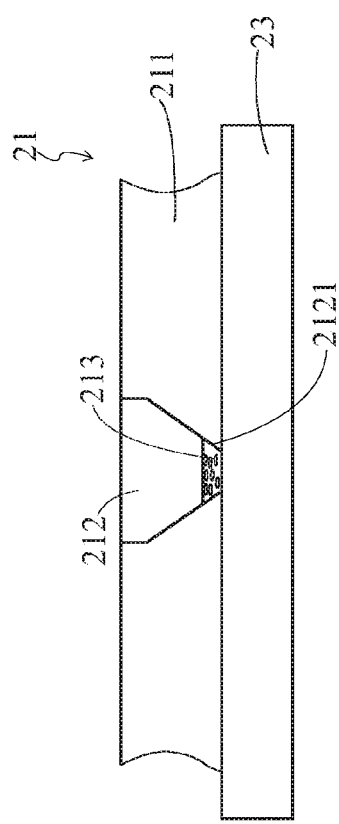
Figure 44D:
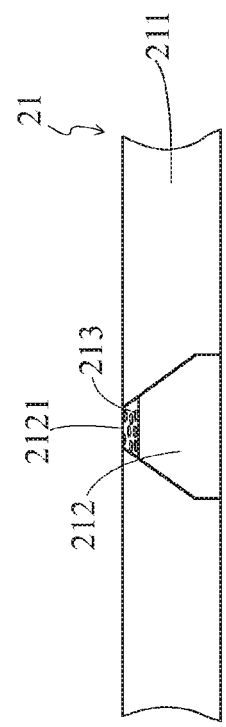

Please refer to FIGS. 44A to 44D, which are schematic views showing a preferred method for manufacturing a light accommodating structure. As shown in FIG. 44A, the light accommodating structure 21 having a through hole 212 as disclosed in the twenty-sixth or the twenty-seventh embodiment is provided. As shown in FIG. 44B, the light accommodating structure 21 is flipped over and laid on a substrate 23 which has a smooth surface. As showing in FIG. 44C, the phosphor layer 213, described in the twenty-eighth embodiment, is applied into the through hole 212 and formed at the small opening 2121 thereof. Finally, as showing in FIG. 44D, after the phosphor layer 213 is cured, the light converting structure 21 could be released from the substrate 23, and the phosphor layer 213 is formed at the small opening 2121.

In this method, the amount and the shape of the phosphor layer 213 disposed in the through hole 212 can be precisely controlled. If the light accommodating structure 21 has several through holes 212 (not shown), the phosphor layers 213 formed in the through holes 212 will be substantially identical in their amounts and shapes. Therefore, the color of the lights passing through the phosphor layers 213 may be maintained equally. In other word, the color variation of the lights could be minimized.

Figure 45:
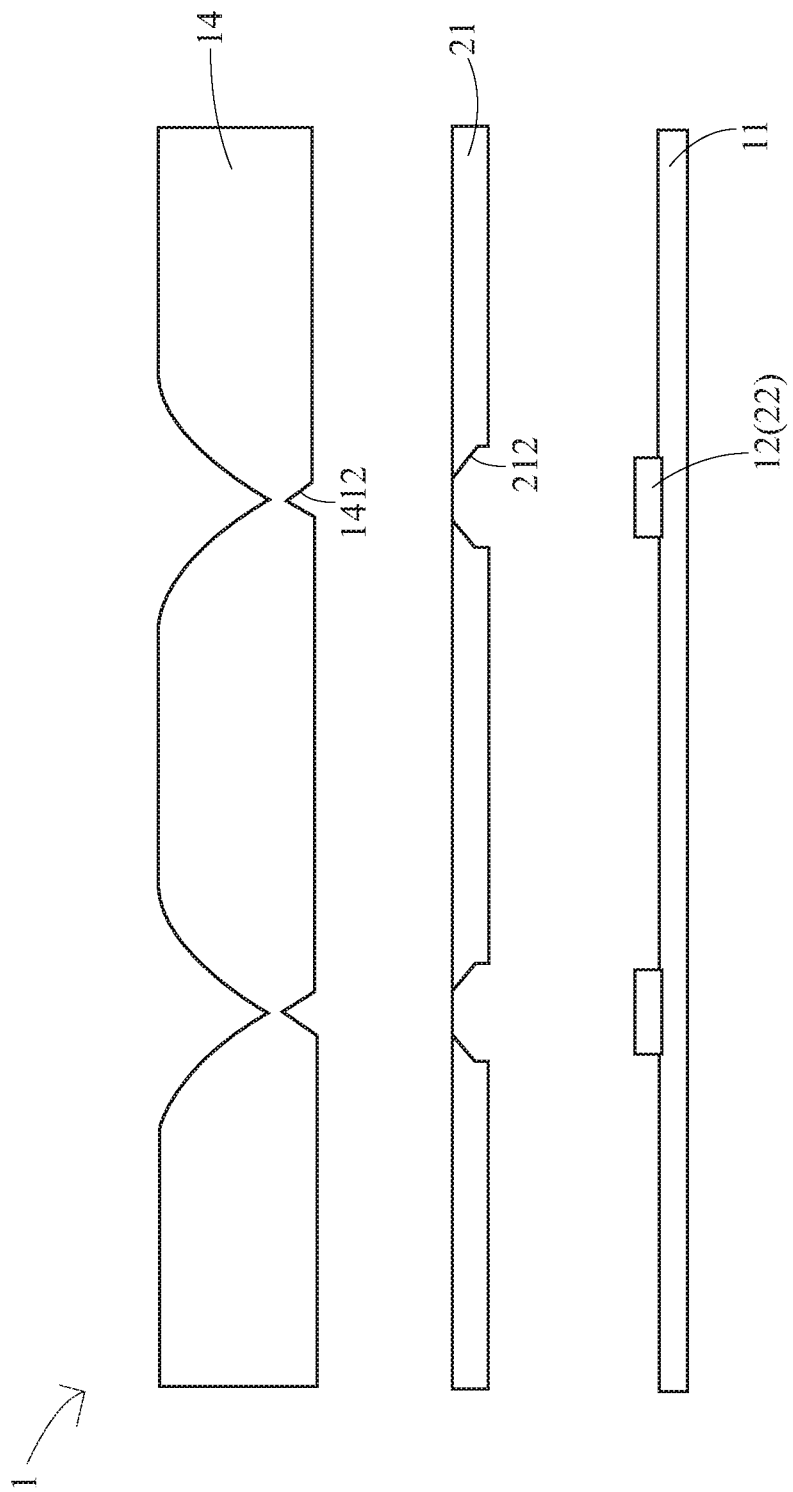
FIGS. 45 to 46 are cross-sectional views showing a utilization of a light accommodating structure in accordance with a thirtieth embodiment of the present invention.
Figure 46:
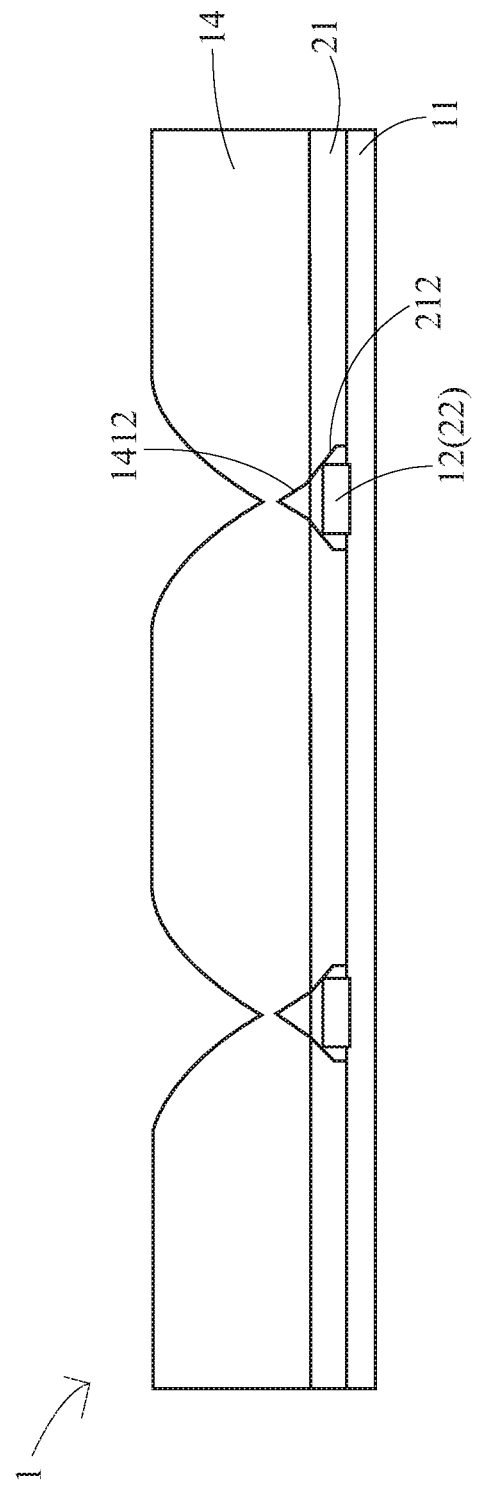

Please refer to FIGS. 45 to 46, which are cross-sectional views showing a utilization of a light accommodating structure in accordance with the twenty-ninth embodiment of the present invention. The light accommodating structure 21 is disclosed in the twenty-sixth to the twenty-eighth embodiments and other equivalent embodiments. As shown in the figures, the light accommodating structure 21 has two through holes 212 (but not limited) without the phosphor layer. The light accommodating structure 21 is disposed between a light converting structure 14 and a PCB 11 with plural light source 12, as disclosed in the first to the twenty-sixth embodiments. The light sources 12 are respectively accommodated in the through holes 212, and the bottom conical recesses 1412 are aligned with the through holes 212. The objective of the light accommodating structure 21 is to provide the light emitting area smaller than that of the light source 12 for fitting with the size of the bottom conical recesses 1412.

Based on our study, the dimensions of the top conical recesses are increased with the increasing of the light emitting area. So, if the light emitting area is reduced, the dimensions of the top conical recesses are reduced too, thereby reducing the thickness of the light converting structure 14.

In conclusion, the combination of the light converting structure and the light accommodating structure successfully provides a solution to convert a large light emitting dimension of the light source to a smaller one without sacrificing the luminance of the light source, and produces a flat lighting device having high luminance and uniform light distribution under an ultra-slim configuration. It is worth to note that using a ceramic or metallic substrate for packaging the SMD type LEDs will result in good heat dissipation and can accommodate a large size LED wafer for high power illumination within a compact package dimension. Therefore, the SMD type LEDs are suitable to be used as the LED light source 12 in this embodiment.

Please recall any one of the light converting structure shown in FIGS. 1 to 34, it is noteworthy that because most of the manufacture process can not make the tips of the top conical recesses 1141 perfectly sharp, the lights fail to totally reflected on the tips and directly leave the light converting structure 14, resulting in hot spots around the tips. To solve the issue, a patterned diffuser film is disclosed to apply in the light converting structure.

Please refer to FIGS. 47 to 51, which are cross-sectional views respectively showing a lighting device in accordance with the thirty-first to thirty-fifth embodiments of the present invention. Compared with the first to the twenty-sixth embodiments, a patterned diffuser film 15 is optionally disposed on the light traveling layer 141 of the light converting structure 14.

The patterned diffuser film 15 comprises a plastic sheet 152 and a plurality of dot diffusing structures 151 coated on the plastic sheet 152. The dot diffusing structures 151 are positioned right above the tips of the top conical recesses 1411 respectively to scatter or reflect lights. So, the hot spots from the tips of the top conical recesses 1411 can be reduced. The plastic sheet 152 can be made of transparent, translucent or semi-transparent polymer materials such as PET, PP, PE, PVC, PC, PMMA, PU, PS, ABS, and etc. The materials of the dot diffusing structures 151 can be made of a light scattering material (e.g. polymeric resin containing $TiO_2$, $CaCO_3$, $ZnO_2$, $SiO_2$, $Al_2O_3$, $SnO_2$ and $CeO_2$ partic metallic particles, or air microvoids or a mixture of plurality types of particles) which can be formed by screen printing, inkjet printing, gravure printing, flexo printing or stamping. In the embodiments, the plastic sheet 152 is not necessary to be in a sheet form. Instead, it can be a film form or a plate form.

The patterned diffuser film 15 can also be made by metal deposition (such as thermal deposition or sputtering) of a metal or alloy (such as Al, Ag, Ni, Mo, Zn, Pt, Au, Cu or other metals and alloys) on a plastic followed by a photolithographic patterning method.

Moreover, the dot diffusing structure 151 can be disposed on either the top surface or the bottom surface of the plastic sheet 152, or printed on both top surface and bottom surface of the plastic sheet in specific patterns.

Figure 47:
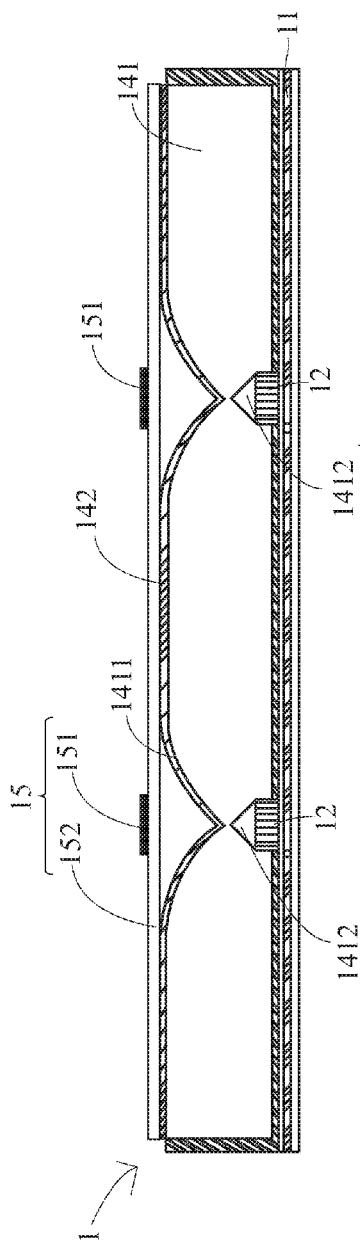
FIG. 47 is a cross-sectional view showing a lighting device in accordance with a thirty-first embodiment of the present invention.
Figure 48:
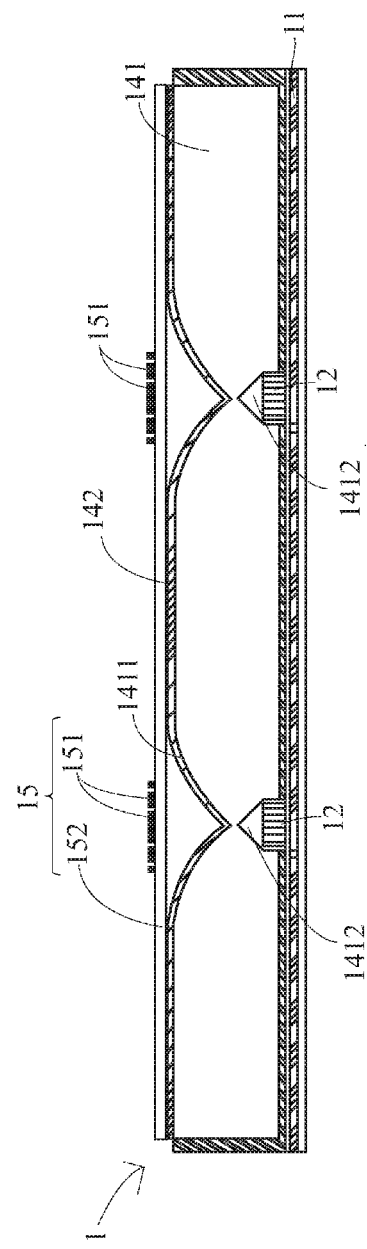
FIG. 48 is a cross-sectional view showing a lighting device in accordance with a thirty-second embodiment of the present invention.

FIG. 47 shows a patterned diffuser film 15 disposed on top of the light converting structure 14, where a single rounded dot 151 is positioned right above the tip of the top conical recesses 1411. FIG. 48 shows a plurality of different sizes of dots 151 instead of a single rounded dot. FIG. 49 shows two different sizes of rounded dots 151 overlaid on top of the other, so that the center region (double layer) of the dots 151 provides less transparency than the outer region (single layer) of the dots 151. FIG. 50 shows a stack of two patterned diffuser film 5 where the dot diffusing structures 151 are respectively disposed on the tops of the plastic sheets 152, and are positioned right above the tips of the top conical recesses 1411. FIG. 51 shows the dot diffusing structure 151 having different patterns disposed on both bottom surface and top surface of the plastic sheet 152 respectively.

Please refer to FIGS. 52 to 58, which are cross-sectional views respectively showing a lighting device in accordance with the thirty-sixth to forty-second embodiment of the present invention. Compared with any of the first to twenty-sixteenth, and thirty-first to thirty-fifth embodiments where microstructure are disposed on the top surface of the light traveling layer, the microstructures 163 are disposed on a plastic sheet 161 in advance (which can be made separately) by micro-embossing, and the plastic sheet 161 is then laminated on the top surface of the traveling layer 141.

Figure 53:
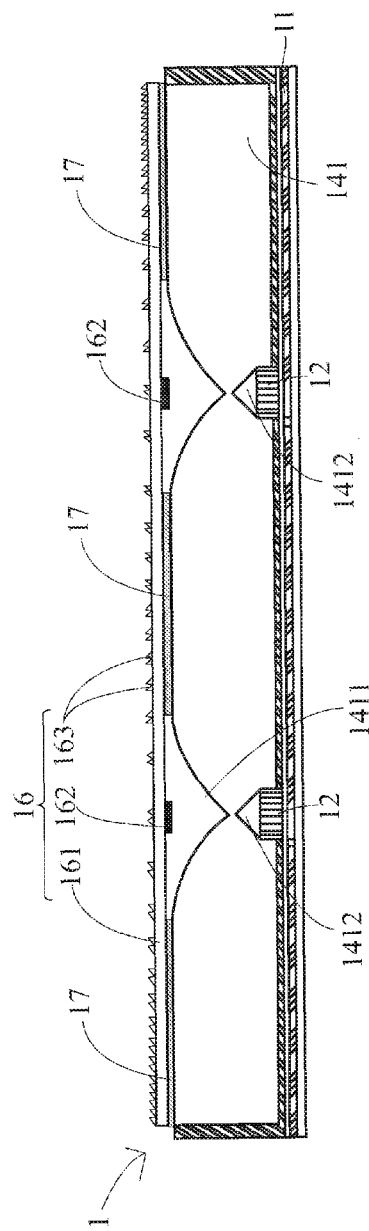
FIG. 53 is a cross-sectional view showing a lighting device in accordance with a thirty-seventh embodiment of the present invention.

As shown in FIG. 52, a light distributing layer 16 with the microstructure 163 having tip shapes (such as cone-shape, pyramid shape, or any irregular shapes) fabricated on the top surface of the plastic sheet 161 is laminated on the top surface of the light traveling layer 141 where an adhesive 17 (which has refractive index similar to the light traveling layer 141) is used to bond the light distributing layer 16 onto the light traveling layer 141. A dot diffusing structure 162 can be optionally disposed on either the top surface or the bottom surface of the light distributing layer 161 as shown in FIGS. 52 and 53.

Figure 54:
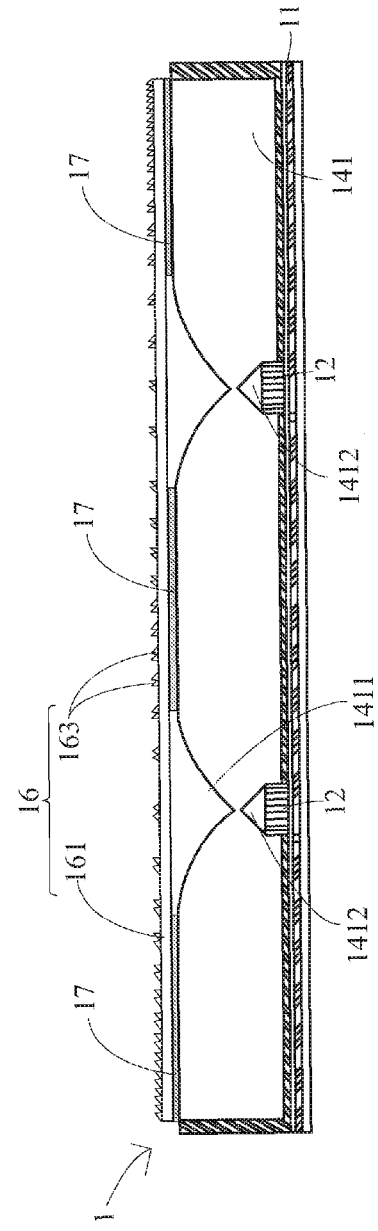
FIG. 54 is a cross-sectional view showing a lighting device in accordance with a thirty-eighth embodiment of the present invention.

Alternatively, the dot diffusing structure 162 can be eliminated but leave the microstructure 163 non-uniformly distributed on the plastic sheet 161 as shown in FIG. 54. The same as the microstructure 142 shown in FIG. 1, the microstructures 163 are adapted to frustrate (or prevent) the total internal reflection. They are distributed in a sparser manner at the region closer to the top conical recess 1411, while the microstructures 163 are distributed in a denser manner at the region away from the top conical recess 1411.

Figure 55:
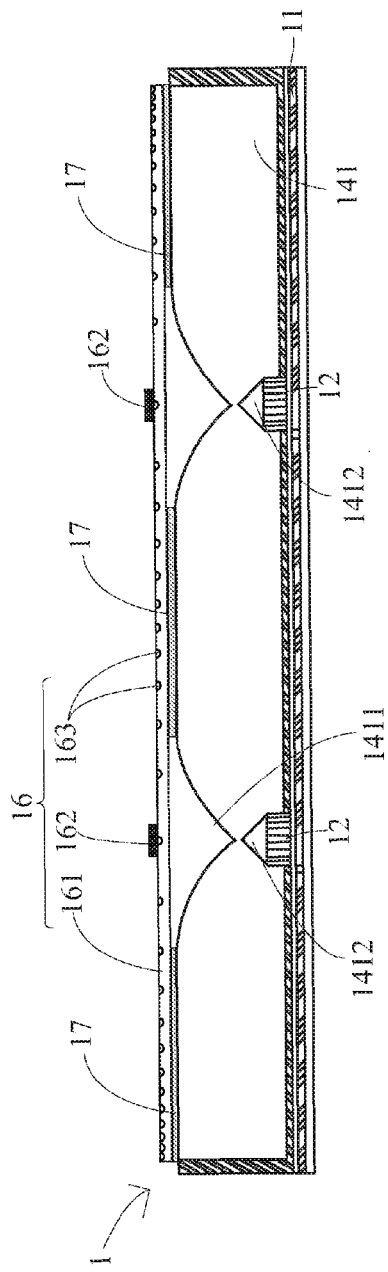
FIG. 55 is a cross-sectional view showing a lighting device in accordance with a thirty-ninth embodiment of the present invention.
Figure 56:
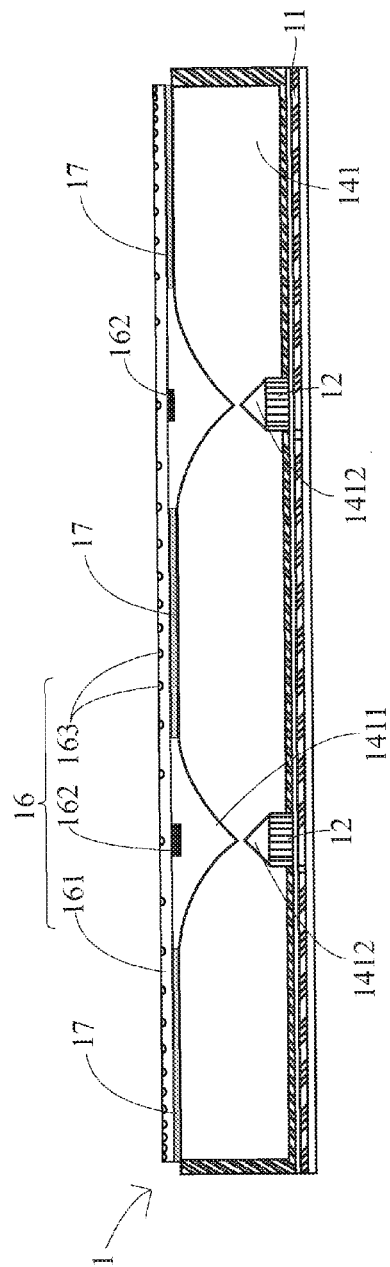
FIG. 56 is a cross-sectional view showing a lighting device in accordance with a fortieth embodiment of the present invention.

The microstructures 163 may be recessed structures, or protruded structures which are fabricated on the plastic sheet 161 by embossing, molding, imprinting or stamping processes. The microstructure 163 can also be made by printing or coating an ink (or paste) material containing transparent or translucent particles such as polymer, glass, $SiO_2$ or ceramic particles where the areas having the ink (or paste) will have un-even surface (in the other word, a certain surface roughness) to alter the light path, therefore, allow lights to escape out of the light traveling layer 141. The lighting device 1 shown in FIGS. 55 to 57 are similar to those shown in FIGS. 52 to 54, and are characterized in that the microstructures 163 are recessed microstructure having rounded shape, such as semi-spherical shape; whereas the lighting device 1 shown in FIG. 58 has protruded microstructures 63 with rounded shape.

The processes of manufacturing the microstructures on the top conical recess of the light converting structure in any of the first to twenty-sixteenth, and thirty-first to thirty-fifth embodiments are disclosed as follows. Note that the microstructures are distributed in a 3-dimensional manner.

Figure 59C:
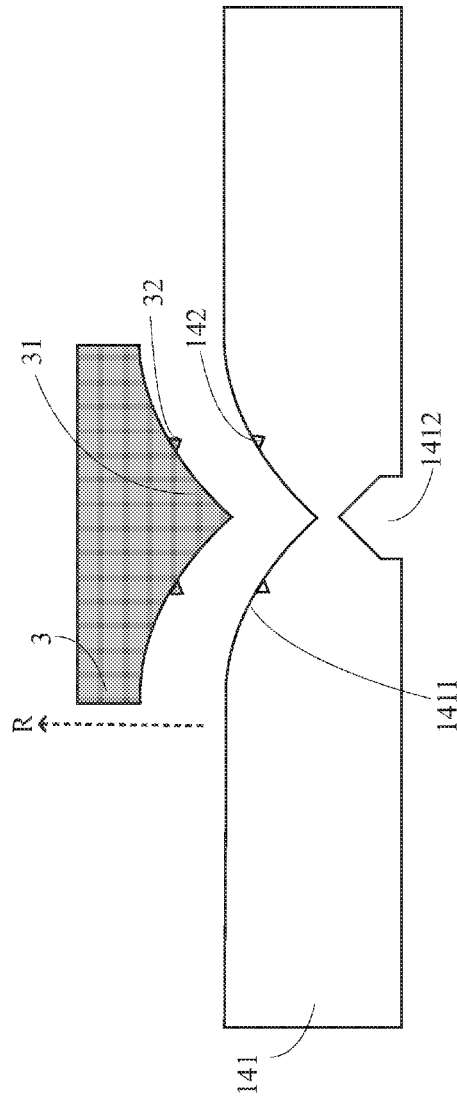

Please refer to FIGS. 59A to 59C, which are schematic views showing a preferred method for manufacturing concave microstructures on the top conical recess of the light converting structure in accordance with the forty-third embodiment of the present invention by using injection molding, embossing, or stamping. As shown in FIG. 59A, a mold 3 is provided. The mold 3 has a protrusion 31 with a shape corresponding to the top conical recess 1411 of the light travelling layer 141, and a plurality of convex structures 32 each with a shape corresponding to the microstructures 142 (as shown in FIG. 59C). As shown in FIG. 59B, the mold 3 and the light travelling layer 141 are then contacted with each other, and the convex structure 32 are pressed into the surface of the top conical recess 1411. As shown in FIG. 59C, when the mold 3 is released from the light travelling layer 141 along a releasing direction R, i.e. upwards, the concave microstructures 142 are formed on the top conical recess 1411.

Figure 60A:
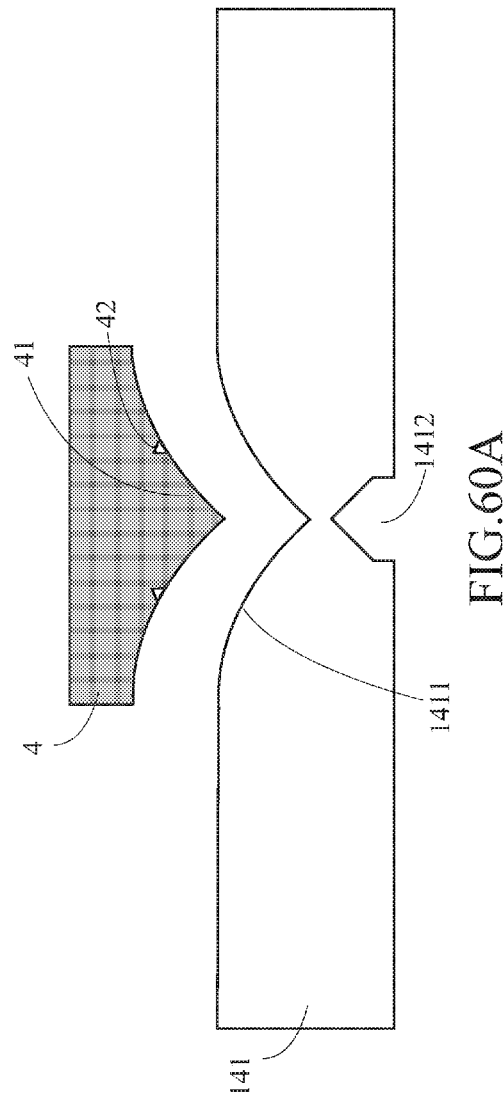

Please refer to FIGS. 60A to 60C, which are schematic views showing a preferred method for manufacturing convex microstructures on a light accommodating structure in accordance with the forty-forth embodiment of the present invention. Similar to the manufacture of concave microstructures shown in FIGS. 59A to 59C, in this embodiment, a mold 4 is provided with a protrusion 41 and a plurality of concave structures 42. The mold 4 is contacted with the light travelling layer 141, and the surfaces of the top conical recess 1411 are pressed into the concave structures 42. The mold 4 is then released from the light travelling layer 141 along a mold releasing direction R, and thus the convex microstructures 142 are formed on the top conical recess 1411.

For not being damaged during releasing the mold 3 or 4, the microstructures 142 should be well designed as a tapered configuration, e.g., substantially cone-shaped. Besides, the top portion and the bottom portion of the microstructure 142 should be totally overlapped along the releasing direction R. For illustration, FIGS. 61A to 61D show some examples of the microstructures 142 following abovementioned criteria. The top portion 1421 and the bottom portion 1422 of the microstructures 142 are totally overlapped with each other along the releasing direction R. In this way, the mold will not damage the microstructures 142 during the mold release. By contrast, some examples of the microstructures 142 failing to follow abovementioned criteria are shown in FIGS. 62A and 62B for references. Obviously, the top portion 1421 and the bottom portion 1422 of the microstructures 142 are not overlapped with each other along the releasing direction R. There is no way for a mold to be released along the releasing direction R without damaging the microstructures 142. In other words, it is impossible to manufacture the microstructures as shown in FIGS. 62A and 62B by using a traditional molding process.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered by the technical concept of the present invention.

What is claimed is:

1. A light converting optical structure, comprising:
 a light traveling layer having a top surface, two lateral surfaces and a bottom surface opposite to the top surface, the top surface being formed with a first top recess, and the bottom surface being formed with a first bottom recess aligned with the first top recess, wherein the top surface is batwing-shaped, the first top recess defines a surface which has a slope being gradually varied, and each of the lateral surfaces has a jagged structure;
 a plurality of microstructures being formed on the top surface of the light traveling layer and the surface of the first top recess, wherein the microstructures which are located on the surface of the first top recess are formed with a three-dimensional distribution;
 a light spreading structure, accommodated within the first bottom recess, wherein the first top recess and the first bottom recess are conical recesses, and the light spreading structure has a conical shape and is spaced apart from the first bottom recess, wherein the light spreading structure has one tip upwards which is aligned with a tip of the first bottom recess; and
 a patterned diffuser film, disposed on the light traveling layer, wherein the patterned diffuser film comprises a plastic sheet and a plurality of dot diffusing structures which are formed on a bottom surface and a top surface of the plastic sheet and located right above a tip of the first top recess.

2. The light converting optical structure as claimed in claim 1, wherein the first bottom recess is defined with a half cone angle which is substantially equal to a critical angel of the light traveling layer.

3. The light converting optical structure as claimed in claim 1, wherein the microstructures are distributed in such a way that being denser when being distant from a tip of the first top recess.

4. The light converting optical structure as claimed in claim 3, wherein the microstructures are further formed on the bottom surface of the light traveling layer.

5. The light converting optical structure as claimed in claim 3, wherein each of the microstructures has a tapered configuration.

6. The light converting optical structure as claimed in claim 5, wherein each of the microstructures has a top portion and a bottom portion, in which the top portion and the bottom portion are overlapped along a mold releasing direction.

7. The light converting optical structure as claimed in claim 1, wherein the first bottom recess has an enlarged lower portion.

8. The light converting optical structure as claimed in claim 1, further comprising a reflective structure being disposed on a lateral surface or the bottom surface of the light traveling layer.

9. The light converting optical structure as claimed in claim 1, wherein the light traveling layer further has a second top recess, and a second bottom recess aligned with the second top recess.

10. The light converting optical structure as claimed in claim 9, wherein the light traveling layer further has an interval trench being formed on the bottom surface and located between the first bottom recess and the second bottom recess.

11. The light converting optical structure as claimed in claim 10, wherein the light traveling layer further comprises a reflective layer being disposed at the interval trench.

12. The light converting optical structure as claimed in claim 9, wherein the light traveling layer further has an interval trench being formed on the top surface and located between the first top recess and the second top recess.

13. A lighting device, comprising:
a printed circuit board;
a light source, disposed on the printed circuit board;
a reflective structure, disposed on the printed circuit board on an area out of the light source; and
a light converting optical structure, comprising a light traveling layer disposed on the reflective structure, the light traveling layer having a top surface, two lateral surfaces and a bottom surface opposite to the top surface, the top surface being formed with a first top recess, and the bottom surface being formed with a first bottom recess aligned with the first top recess for accommodating the light source, wherein the top surface is batwing-shaped, the first top recess defines a surface which has a slope being gradually varied, and each of the lateral surfaces has a jagged structure;
wherein the light converting optical structure further comprises a plurality of microstructures being formed on the top surface of the light traveling layer and the surface of the first top recess, and the microstructures which are located on the surface of the first top recess are formed with a three-dimensional distribution, and
wherein the light converting optical structure further comprises a light spreading structure and a patterned diffuser film, the light spreading structure is accommodated within the first bottom recess and covers the light source; the first top recess and the first bottom recess are conical recesses, and the light spreading structure has a conical shape and is spaced apart from the first bottom recess, wherein the light spreading structure has one tip upwards which is aligned with a tip of the first bottom recess;
wherein the patterned diffuser film comprises a plastic sheet and a plurality of dot diffusing structures which are formed on a bottom surface and a top surface of the plastic sheet and located right above a tip of the first top recess.

14. A lighting device, comprising:
a printed circuit board;
a light source, disposed on the printed circuit board;
a light accommodating optical structure disposed on the printed circuit board, the light accommodating optical structure comprising a light accommodating layer, the accommodating layer being formed with a through hole, wherein the through hole is an asymmetric half-cone shaped hole and has a top opening and a bottom opening larger than the top opening, wherein the light source is accommodated within the through hole and located at the bottom opening, and an inner surface of the through hole of the accommodating layer is reflective; and
a light converting optical structure, comprising a light traveling layer disposed on the light accommodating layer, the light traveling layer having a top surface, two lateral surfaces and a bottom surface opposite to the top surface, the top surface being formed with a top recess, and the bottom surface being formed with a bottom recess aligned with the top recess and the through hole, wherein the top recess defines a surface which has a slope being gradually varied, and each of the lateral surfaces has a jagged structure; and
a patterned diffuser film, disposed on the light traveling layer, wherein the patterned diffuser film comprises a plastic sheet and a plurality of dot diffusing structures which are formed on a bottom surface and a top surface of the plastic sheet and located right above a tip of the top recess;
wherein the light accommodating optical structure further comprises a phosphor layer which is located within the top opening of the through hole and a top surface of the phosphor layer is aligned with a top surface of the light accommodating optical structure.

* * * * *